(12) United States Patent
Diba

(10) Patent No.: US 9,875,653 B2
(45) Date of Patent: Jan. 23, 2018

(54) ELECTRONIC TRAFFIC ALERT SYSTEM

(71) Applicant: Keyvan T. Diba, Los Angeles, CA (US)

(72) Inventor: Keyvan T. Diba, Los Angeles, CA (US)

( * ) Notice: Subject to any disclaimer, the term of this patent is extended or adjusted under 35 U.S.C. 154(b) by 0 days.

(21) Appl. No.: 15/421,378

(22) Filed: Jan. 31, 2017

(65) Prior Publication Data
US 2017/0148317 A1    May 25, 2017

Related U.S. Application Data

(63) Continuation-in-part of application No. 14/010,410, filed on Aug. 26, 2013, now Pat. No. 9,564,049.

(51) Int. Cl.
| | |
|---|---|
| G08G 1/00 | (2006.01) |
| G08G 1/09 | (2006.01) |
| G08G 1/095 | (2006.01) |
| G08G 1/04 | (2006.01) |
| G08G 1/14 | (2006.01) |
| G08G 1/005 | (2006.01) |
| G08G 1/056 | (2006.01) |
| G08G 1/096 | (2006.01) |
| G01S 19/17 | (2010.01) |

(52) U.S. Cl.
CPC .............. *G08G 1/091* (2013.01); *G01S 19/17* (2013.01); *G08G 1/005* (2013.01); *G08G 1/04* (2013.01); *G08G 1/056* (2013.01); *G08G 1/095* (2013.01); *G08G 1/096* (2013.01); *G08G 1/142* (2013.01)

(58) Field of Classification Search
CPC .................................. B60Q 1/00; B60Q 22/00
See application file for complete search history.

(56) References Cited

U.S. PATENT DOCUMENTS

| | | |
|---|---|---|
| 2,850,717 A | 9/1958 | Wiswell |
| 3,484,973 A | 12/1969 | Evenson |
| 4,704,610 A | 11/1987 | Davidson |
| 4,775,865 A | 10/1988 | Smith |
| 5,172,113 A | 12/1992 | Hamer |
| 5,347,120 A | 9/1994 | Decker et al. |
| 5,495,243 A | 2/1996 | McKenna |
| 5,539,398 A | 7/1996 | Hall |
| 5,602,739 A | 2/1997 | Haagenstad et al. |
| 5,633,629 A | 5/1997 | Hochstein |

(Continued)

*Primary Examiner* — Shirley Lu
(74) *Attorney, Agent, or Firm* — Robert J. Lauson, Esq.; Lauson & Tarver LLP

(57) ABSTRACT

An electronic traffic alert system for communicating with an emergency vehicle and a centralized traffic control station includes a traffic display having a screen for displaying graphics and configured to hold a plurality of modules. The modules are of substantially uniform shape, such that individual modules are interchangeably connectable to the traffic display, and the plurality of modules are mounted below the screen so that at least one of them extends below the traffic display. The traffic display also includes a central processor in communication with the plurality of modules and the screen, with the central processor configured to display a predetermined graphic on the screen according to input from at least one of the plurality of modules, and an interface for transmitting traffic-related information to the traffic display from and a centralized traffic control station.

17 Claims, 29 Drawing Sheets

(56) References Cited

U.S. PATENT DOCUMENTS

| | | |
|---|---|---|
| 5,635,920 A | 6/1997 | Pogue |
| 5,734,315 A | 3/1998 | Skeen |
| 5,917,431 A | 6/1999 | Sanada |
| 5,929,787 A | 7/1999 | Mee et al. |
| 6,064,319 A | 5/2000 | Matta |
| 6,133,849 A | 10/2000 | McConnell et al. |
| 6,133,854 A | 10/2000 | Yee et al. |
| 6,476,715 B1 | 11/2002 | Bromer |
| 6,621,420 B1 | 9/2003 | Poursartip |
| 7,061,395 B1 | 6/2006 | Bromer |
| 7,098,806 B2 | 8/2006 | Bachelder |
| 7,113,108 B1 | 9/2006 | Bachelder |
| 7,116,245 B1 | 10/2006 | Bachelder |
| 7,232,067 B1 | 6/2007 | Bromer |
| 7,248,149 B2 | 7/2007 | Bachelder et al. |
| 7,265,683 B2 | 9/2007 | Bachelder |
| 7,280,674 B2 | 10/2007 | Matveev |
| 7,307,547 B2 | 12/2007 | Schwartz |
| 7,327,280 B2 | 2/2008 | Bachelder et al. |
| 7,333,028 B2 | 2/2008 | Schwartz |
| 7,375,650 B2 | 5/2008 | Lo |
| 7,417,560 B2 | 8/2008 | Schwartz |
| 7,432,826 B2 | 10/2008 | Schwartz |
| 7,446,674 B2 | 11/2008 | McKenna |
| 7,515,064 B2 | 4/2009 | Schwartz |
| 7,538,687 B2 | 5/2009 | McKenna |
| 7,573,399 B2 | 8/2009 | Schwartz |
| 7,586,405 B1 | 9/2009 | Brandenburg |
| 7,864,071 B2 | 1/2011 | Bachelder et al. |
| 7,884,738 B2 | 2/2011 | Pappas |
| 7,982,631 B2 | 7/2011 | Schwartz et al. |
| 8,054,200 B1 | 11/2011 | Nelson |
| 8,054,202 B1 | 11/2011 | Sikora et al. |
| 8,072,346 B2 | 12/2011 | Hall et al. |
| 8,111,208 B2 | 2/2012 | Brown |
| 2002/0134423 A1 | 9/2002 | Eller |
| 2004/0145497 A1* | 7/2004 | Pearson .................. G08G 1/07 340/906 |
| 2005/0222769 A1* | 10/2005 | Simon ...................... G06F 7/00 701/300 |
| 2007/0000849 A1 | 1/2007 | Lutz |
| 2010/0238090 A1 | 9/2010 | Pomerantz |

* cited by examiner

ELECTRONIC TRAFFIC ALERT SYSTEM

This application is a continuation-in-part of co-pending application Ser. No. 14/010,410, filed on 26 Aug. 2013, which claims the priority filing date of provisional application 61/692,804, filed 24 Aug. 2012.

BACKGROUND

The present invention is directed to electronic signs and signage including hanging signage presenting highly visible visual warnings, messages, or other information to drivers both during the regular course of driving and in emergency situations.

Powered traffic signals or "stop lights" have existed since the early twentieth century. These signals have remained essentially the same in general concept with a few added refinements added such as turn arrows and symbolic "walk" or "don't walk" messages. Over the years, ground travel in and around cities has become increasingly congested with growing vehicular traffic including passenger cars, trucks, emergency vehicles, busses, trains and the like all moving through densely-populated areas.

While non-passenger vehicles such as police cars, fire trucks and ambulances typically emit visual and audible warnings as they approach intersections, they frequently lack the right-of-way, and warnings emitted from their vehicles are often unseen and/or unheard, leading to collisions and injury. In view of the increased density and speed of vehicular traffic and the current primitive state al signage technology, it is desirable for municipalities to provide significantly improved signaling and signage at intersections for better vehicular flow, safety, and to provide warnings and information among other reasons.

Known systems in the art for interfacing traffic control with emergency vehicles are known. U.S. Pat. No. 5,539,398 to Bystrak et al. discloses an enhanced group addressing system including an apparatus and method for addressing a spaced-apart detectors or control units in a multiple zone detection system. This system, which shortens the time needed for a centrally located control element to communicate with the detectors, is used for existing traffic control systems.

U.S. Pat. No. 5,172,113 to Hamer discloses a system and method for transmitting data in an optical traffic preemption system. Using this system an ambulance or other emergency vehicle may optically transmit data from an optical emitter to a detector mounted along a traffic route via a stream of light pulses. The light pulses cause a traffic signal to change allowing the approaching emergency vehicle to pass. This system lacks any communication with a central traffic command.

U.S. Pat. No. 7,113,108 to Bachelder, et al. discloses an emergency vehicle control system traffic loop preemption system. The system uses existing inductive traffic loops that are either "car-active" or "car-passive." In the "car-active" system, a passive element having position information transmits an ID tag and the position information to a transceiver in the vehicle when an emergency vehicle is detected by the existing inductive traffic loop. In the "car-passive" system, a transceiver at the intersection is activated to send an excitation signal to a transponder on the emergency vehicle, which responds with the emergency vehicle ID. This system interfaces with a central traffic control, but lacks any method of redundantly checking to make sure signal changes occur.

U.S. Pat. No. 4,704,610 to Davidson et al. discloses an emergency vehicle warning and traffic control system. This system provides early warning of the approach of an emergency vehicle and provides a display to indicate the direction from which the emergency vehicle is approaching, and preemption of traffic signals. A transmitter mounted on an emergency vehicle transmits a signal whenever it is on an emergency call, which is received by infrared receivers positioned at an intersection. This system relies on infra-red transmission of data, and cannot easily integrate with existing traffic central control computer systems.

Since known systems are inefficient and ineffective in providing information to drivers for collision avoidance or other purposes, the present invention as described herein takes major steps forward to accomplishing these objectives. One important goal of the present invention is to provide a more effective traffic signal preemption system. Currently in the market, devices exist to preempt the normal operation of a traffic signal, such as a strobe light system. While this is useful in emergencies, drivers are often unaware of where the emergency vehicles are as they approach an intersection. By providing programmed LED text and graphical movement, the present invention aims to solve problems in the prior art and reduce emergency response time. Another goal of the present invention is to provide a signal control and data transmission system capable of easy integration into existing systems known in the art.

SUMMARY

An electronic traffic alert system for communicating with an emergency vehicle and a centralized traffic control station includes one or more traffic displays, each comprising a screen for displaying graphics. Each traffic display is configured to hold a plurality of modules. Each of the modules has a substantially uniform shape, such that individual modules are interchangeably connectable to the traffic display according to preference, and the plurality of modules are mounted below the screen such that at least one of the plurality of modules extends below the traffic display.

Each traffic display also includes a central processor in communication with both the plurality of modules and the screen. The central processor is configured to display a predetermined graphic on the screen according to input from at least one of the plurality of modules. Each traffic display also includes an interface to transmit traffic-related information between the traffic display and a centralized traffic control station, thereby allowing control of the traffic display by the centralized traffic control station.

A connector strip is located inside each of the traffic displays for removably connecting each of the plurality of modules for ease of service and replacement, the connector strip providing power and information transmission. Preferably multiple traffic displays are located at a single intersection and are wirelessly connected for coordinating messages displayed on the screen of each of the multiple traffic displays.

In one embodiment, one of the plurality of modules includes an infrared vehicle detector for detecting approaching emergency vehicles and displaying a warning for drivers to pull over. In another embodiment, one of the plurality of modules includes a light sensor and the central processor is configured to automatically change a brightness level of the screen under changing ambient light conditions. In another embodiment, one of the plurality of modules comprises a distance detector for detecting objects persisting under the traffic display. In another embodiment, one of the plurality of modules comprises a parking module in communication with a parking server through a cellular network, the parking module configured to receive available parking space information for display on the screen.

The central processor may be in communication with a pedestrian crossing monitor that provides the status of pedestrian crossing signals at an intersection where the traffic display is installed. In such a configuration one of the plurality of modules comprises a pedestrian module for displaying on the screen pedestrian crossing signal information corresponding to the status. In various alternative embodiments, the plurality of modules may include features selected from the group consisting of loudspeaker, camera, thermometer, air quality sensor, and back-up battery pack.

In one preferred embodiment, one of the plurality of modules is capable of receiving emergency-related information from a moving vehicle and thereafter causing the traffic display to indicate the direction of the vehicle to drivers travelling in a perpendicular direction. Additionally, one of the plurality of modules is configured to receive GPS proximity information from a cell phone, wherein the central processor displays an alert on the screen corresponding to the cell phone. Regardless of the modules installed, the traffic display is preferably capable of receiving emergency-related information from the centralized traffic control station and thereafter displaying an alert to drivers regarding lane direction changes.

The traffic display preferably comprises a protective cowl at least partially around the screen to protect the screen from the elements. The traffic display may also comprise a bumper in front of the screen to protect against impact. In one anticipated installation, the traffic display is mounted proximal a street sign, the traffic display further comprising a light for illuminating the street sign. Each traffic display may also be configured for installation adjacent a second traffic display for creating an enlarged screen.

DESCRIPTION

Figure 1:
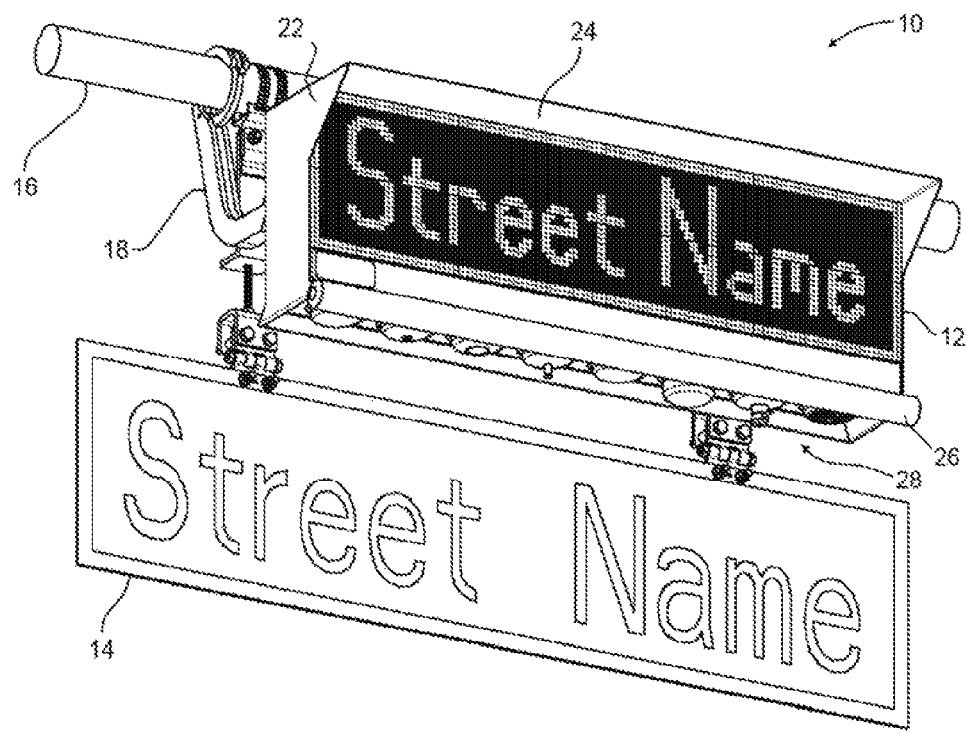
FIG. 1 illustrates a perspective view of a first embodiment traffic alert sign affixed to a conventional light/signal pole.
Figure 2:
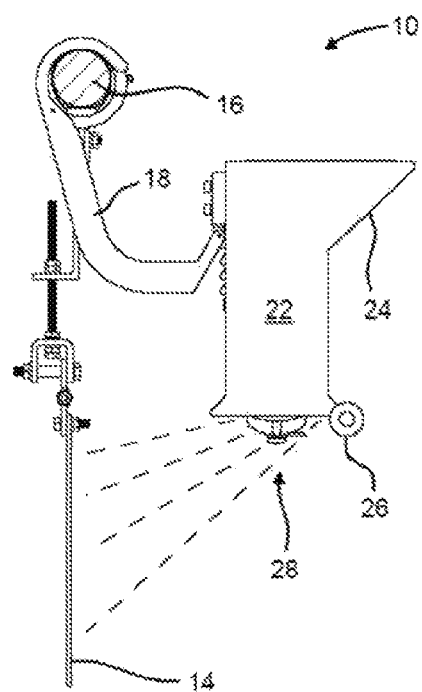
FIG. 2 illustrates a side view of the traffic alert sign illuminating a street sign.

Referring to FIGS. 1 and 2, the electronic traffic alert system includes a first embodiment traffic display 10. The traffic display 10 has a large screen 12 adapted for displaying a variety of signals, warnings and other traffic related information discussed below. In the illustrated embodiment for example, a display matching a street sign 14 associated with the traffic display 10 is displayed. Like the street sign 14, the traffic display 10 is affixed to a lamp post 16. In the illustrated embodiment, a specialized mounting bracket 18 is used independent of the street sign mount 20, for independently affixing the traffic display 10 to the lamp post 16 and allowing it to swing on the mounting bracket 18. Preferably the traffic display 10 is connected to the mounting bracket 18 in a hinged manner, allowing it to swing relative to the mounting bracket 18. The screen 12 is protected by a housing 22, including a cowl 24 for providing shade. A bumper 26 is provided in front of the screen 12 to protect it as well as a series of sensor modules 28 mounted below the screen 12. The sensor modules 28 provide sensing and data reporting capabilities regarding traffic conditions. Referring specifically to FIG. 2, the traffic display 10 is adapted to illuminate the street sign 14.

Figure 3:
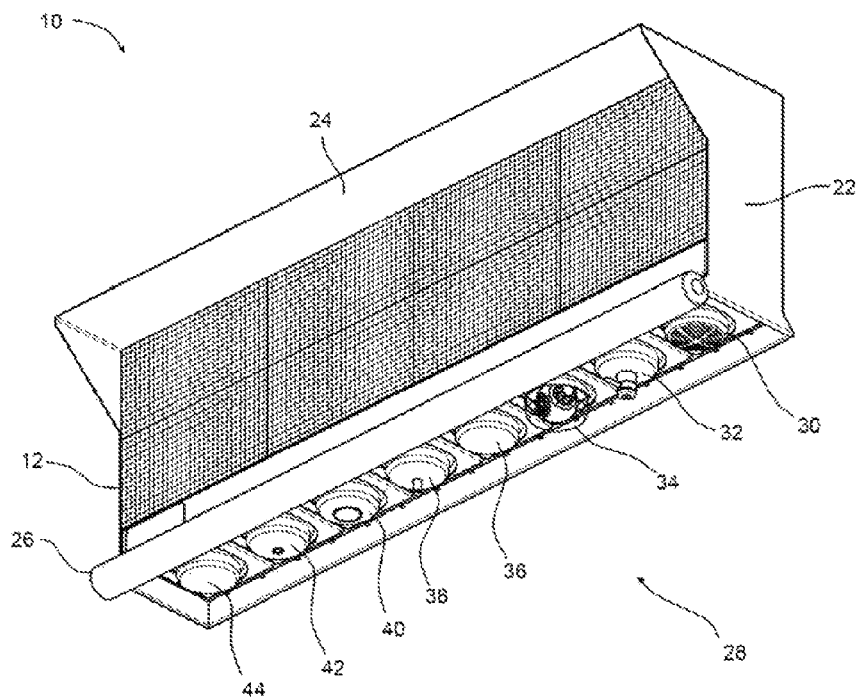
FIG. 3 illustrates a bottom perspective view of the traffic alert sign showing interchangeable sensor modules adapted for insertion therein.

Referring to FIG. 3, the traffic display 10 is shown, including the screen 12, housing 22, cowl 24 and bumper 26. Additionally, a series of sensor modules 28 are shown. In the illustrated embodiment, these sensor modules 28 include a loudspeaker module 30, an infrared sensing module 32, a camera module 34, a battery pack module 36, a thermometer module 38, a range sending module 40, an air quality (for example ozone ($O_3$) or carbon monoxide ($CO$)) sensing module 42 and a blank module 44. Each of the sensor modules 28 will be discussed individually. In FIGS. 7-21.

Figure 4:
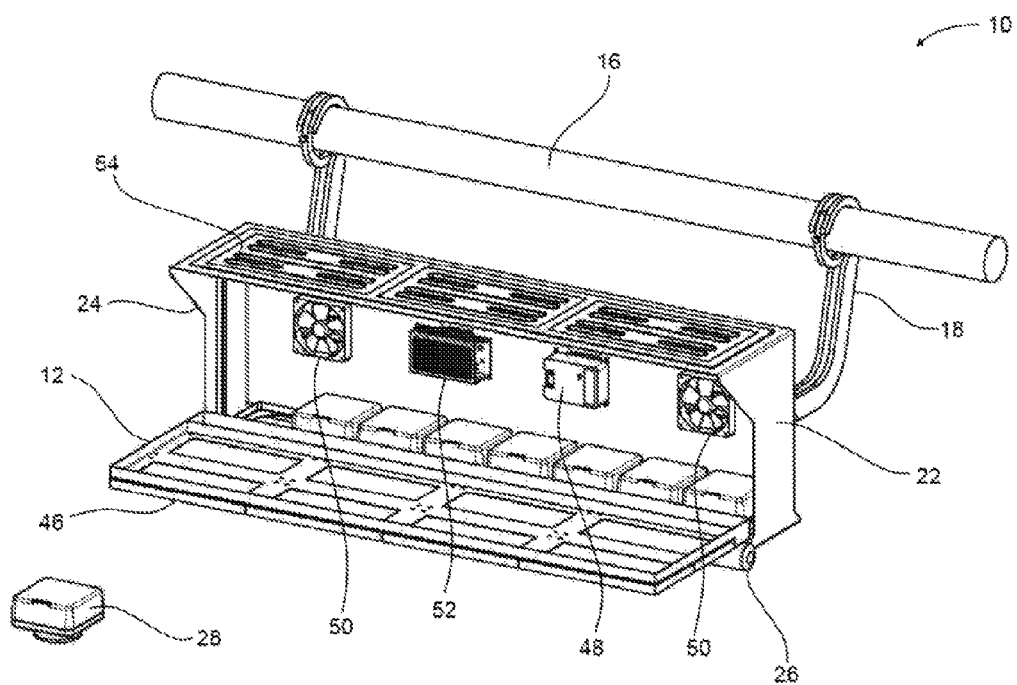
FIG. 4 illustrates a perspective view of the traffic display with an LED screen panel open to access its sensor modules and internal components.

Referring to FIG. 4, the traffic display 10 is shown opened, to reveal the back side of the screen 12, and the interior of the housing 22. A sensor module 28 has been removed from the traffic display 10 to show that all sensor modules 28 have the same outer dimensions, thus allowing users to customize the traffic display 10 with individually selected sensor modules 28. In this embodiment the sensor modules 28 are installed and removed by opening the screen 12 to access the inside of the housing 22. As shown in this view, the screen 12 may be made of a series of individual replaceable LED panels 46 arranged adjacent each other and programmed to function as a single screen. Also shown in this view, information generated by the sensor modules 28 is preferably collected at a central processor 48 mounted in the housing 22. Also mounted to the housing 22 are cooling fans 50 to prevent overheating and moisture collecting in the housing 22.

In one embodiment, the central processor 48 may be a CPU, including a mini pc-type CPU having an operating system with graphics capability, memory storage, and on-board RAM memory, including features for wired (e.g., USB, HDMI, 3.5 mm Headphone, and other connectors) and wireless (Bluetooth, WiFi, etc.) data transmission capabilities. To regulate and provide power to the central processor 48, sensor modules 28, cooling fans 50, and to illuminate the street sign 14, a power supply 52 is also mounted inside the housing 22. The power supply 48 may receive power from a municipal source powering the lamp post 16. Additionally, or in lieu of external power, the power supply 48 may receive power from a series of solar cells 54 installed on the top of the traffic display 10.

Figure 5:
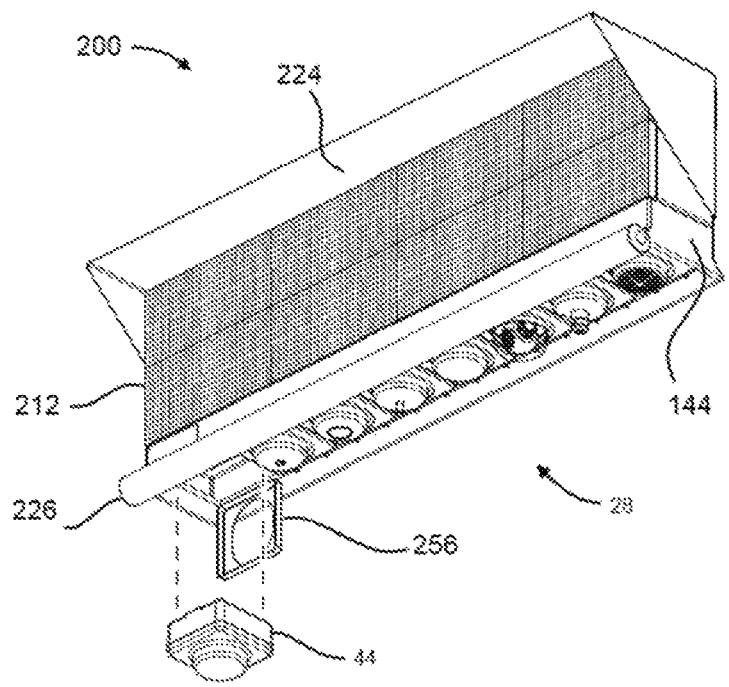
FIG. 5 illustrates a second embodiment traffic alert sign incorporating a preexisting display screen, with a sensor module being installed therein.
Figure 6:
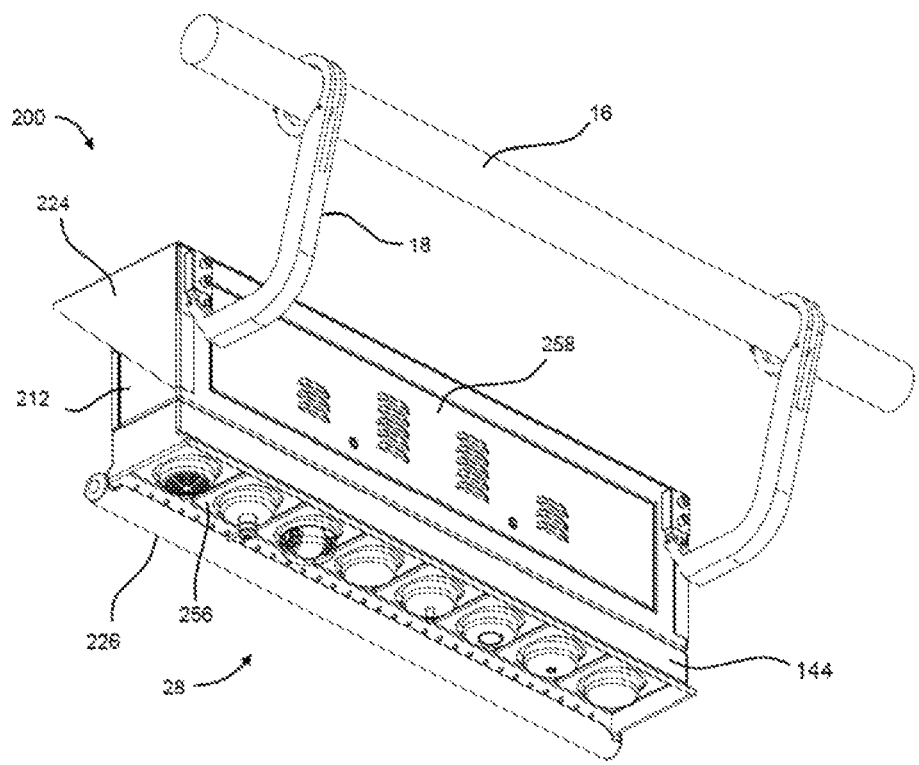
FIG. 6 illustrates the second embodiment traffic alert sign affixed to a conventional light/signal pole.

Referring to FIGS. 5 and 6, a second embodiment traffic display 100 is shown. The second embodiment traffic display 100 is shown. This embodiment incorporates a pre-existing screen 112 avoiding the need for the first embodiment housing 22, and requiring only a cowl 124 for shading. The like the first embodiment traffic display 10 the second embodiment traffic display 100 includes a bumper 126 for protection. The second embodiment traffic housing 100 accepts the same sensor modules 28 (such as the blank module 44 shown being installed) as the first embodiment traffic housing 100, but since the pre-existing screen 112 doesn't open, the sensor modules 28 are accessed through hinged panels 156 that individually retain the sensor modules 28 under the pre-existing screen 112. The inside of the second embodiment traffic display 100 is accessed through a rear access panel 158 for maintenance and repair. The rear access panel 158 may be lockable and vented according to preference. The second embodiment traffic display 100 preferably attaches to the same mounting brackets 18 as the first embodiment traffic display 10, allowing it to be used in the same manner, suspended in a swinging arrangement from the lamp post 16.

Referring to FIGS. 7-21 individual sensor modules 28 and their uses are shown and described. The loudspeaker module 30, its functions being widely known, requires no individual illustration or discussion. Like all sensor modules 28, the loudspeaker module 30 can be interchangeably inserted into the first embodiment housing 22 or second embodiment housing 124. Similarly, the battery pack module 36 and blank module 44, their features and installation having been described, do not required individual discussion. Since all modules 28 are preferably the same shape, the battery pack module 36 and blank module 44 are installed in the same manner as the other modules 28.

Figure 7:
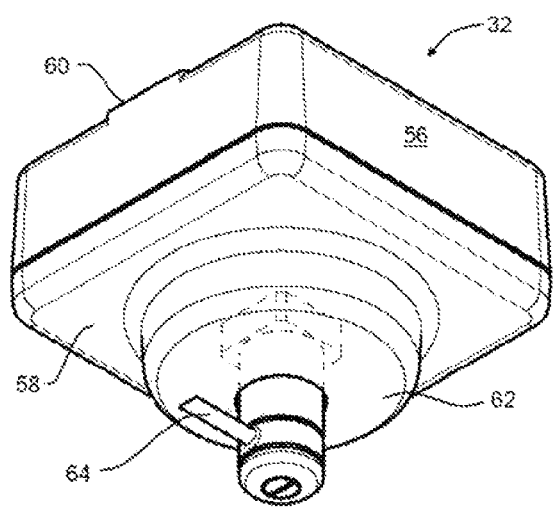
FIG. 7 illustrates a perspective view of an infrared receiver module.
Figure 8:
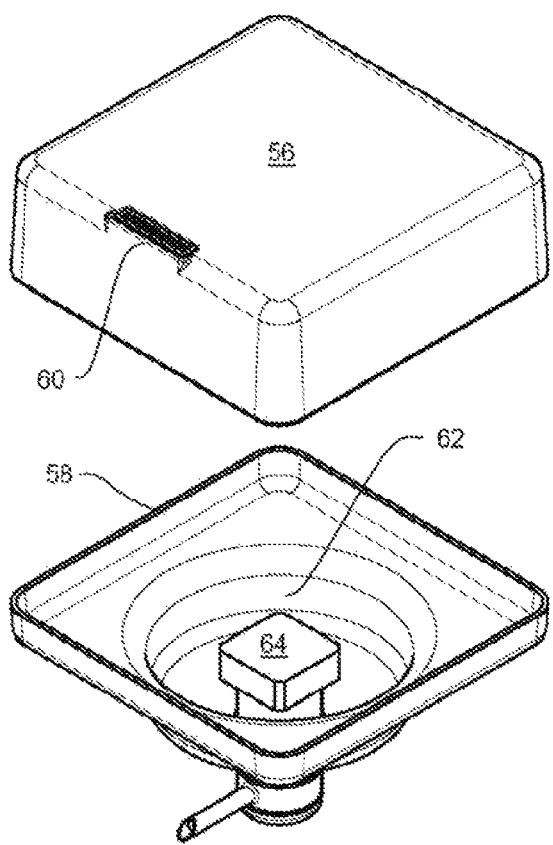
FIG. 8 illustrates an exploded view of the infrared receiver module.

Referring to FIGS. 7 and 8, the infrared module 32, like all sensor modules 28, (including the loudspeaker module 30 and blank module 44) includes a top shell 56 and a bottom shell 58. The top shell 56 includes a connector 60 for communicating with the central processor 48 (FIG. 4). The bottom shell 58 includes a protruding portion 62 designed to extend below the traffic display 10, thereby clearing the housing 22 and the bumper 26. An infrared sensor 64 is mounted in the bottom shell 58 and is aimed at oncoming traffic.

Figure 9:
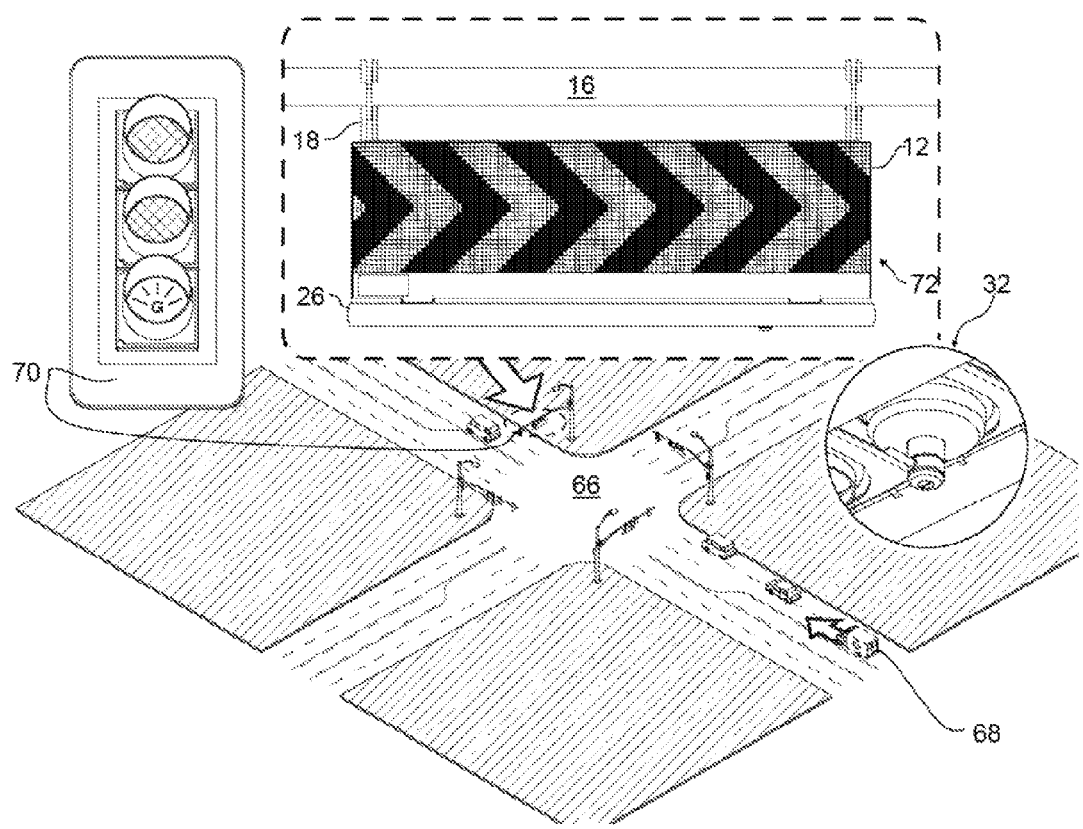
FIG. 9 illustrates an intersection with the infrared receiver module in operation detecting an emergency vehicle and the screen displaying a 'pull over' signal.

FIG. 9 shows the infrared sensor module 32 is shown in operation installed at an intersection 66. The infrared sensor 64 is aimed at an oncoming emergency vehicle 68 such as an ambulance as illustrated. A corresponding emitter (not shown) on the emergency vehicle 68 emits an infrared signal (not shown) which is detected by the infrared sensor module 32. The infrared sensor module 32 communicates with the central processor 48 (FIG. 4), which causes a traffic light 70 the emergency vehicle 68 is approaching to preemptively turn green. This process is similar to conventional infrared emergency vehicle detectors in the art. The process is improved upon herein in that the processor 48 displays a 'pull over' signal 72, such as animated arrows as shown, alerting drivers in front of the emergency vehicle 68 of its presence and reminding them to pull over out of the way.

Figure 10:
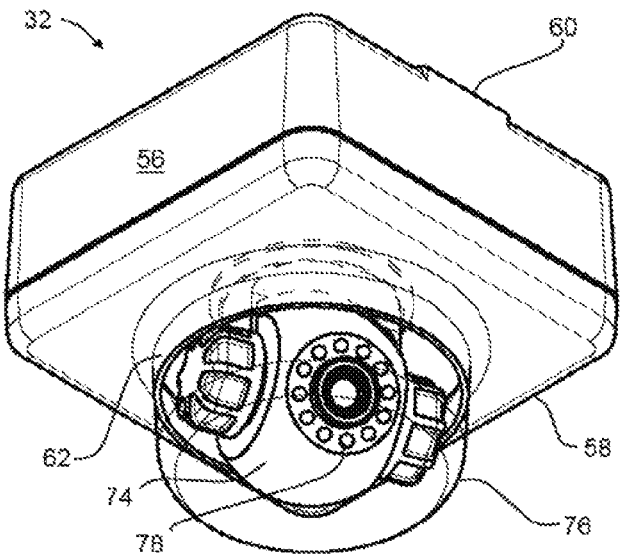
FIG. 10 illustrates a perspective view of a camera module.
Figure 11:
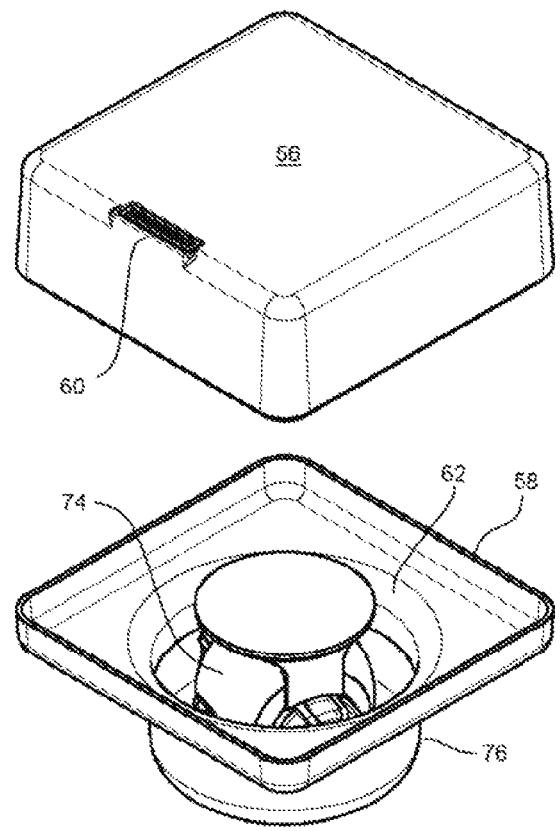
FIG. 11 illustrates an exploded view of the camera module.

Referring to FIGS. 10 and 11, the camera module 34 is shown. The camera module 34 includes a multidirectional camera 74 in a camera housing 76 for protection. The camera is preferably steerable upon instructions from the central processor 48 (FIG. 4) and optionally by remote control from another control source. The camera 74 preferably has infrared lighting 78 and infrared sensing capability for viewing in darkness. In one preferred embodiment, license plate and other similar recognition software may perform analysis on images or video captured by the camera 74 to relay information to the police or other authorities.

Figure 12:
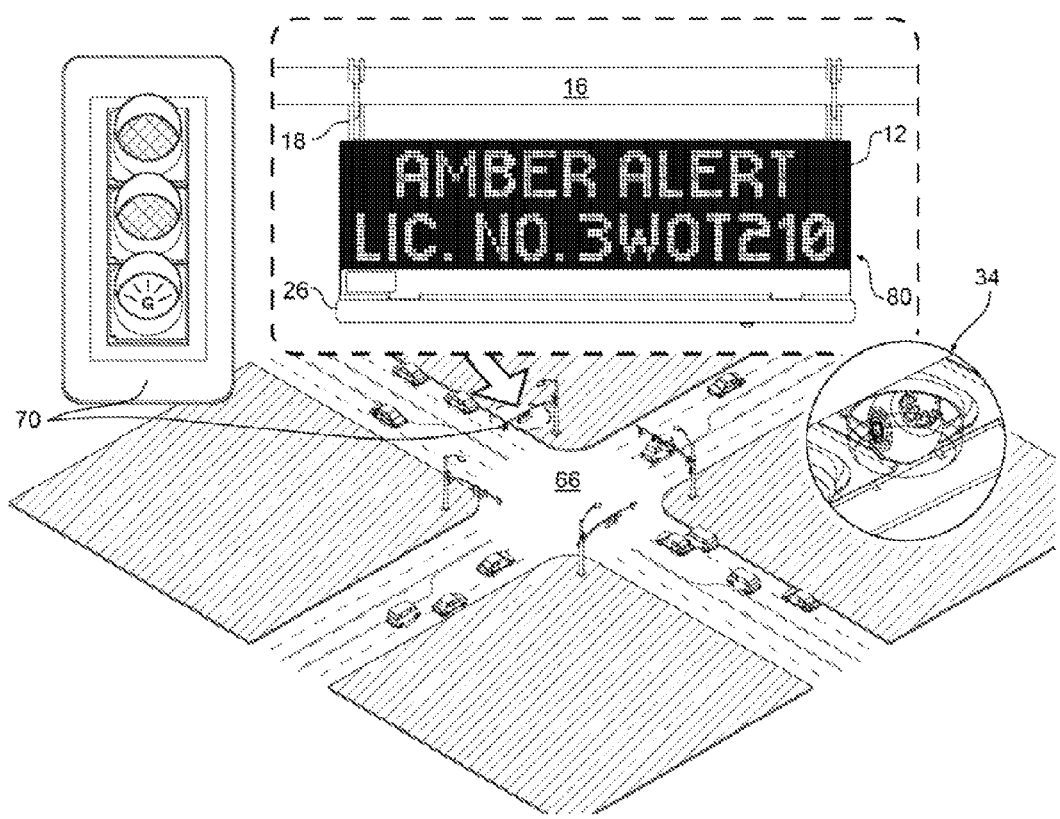
FIG. 12 illustrates an intersection with the camera module in operation and the screen displaying a government issued abducted child alert.

Referring to FIG. 12, the camera module 34 is shown in operation installed at an intersection 66. In the exemplary installation, a state issued alert 80, such as an "amber" (i.e., abducted child) alert causes the traffic display 10 to activate the camera 74, which may be aimed in various directions, including directions of a predetermined number and position to detect an automobile having a predetermined license plate number (not shown). In connection with activating the camera 74, the central processor 48 causes the screen 12 to display the state issued alert 80, thereby alerting other drivers.

Figure 13:
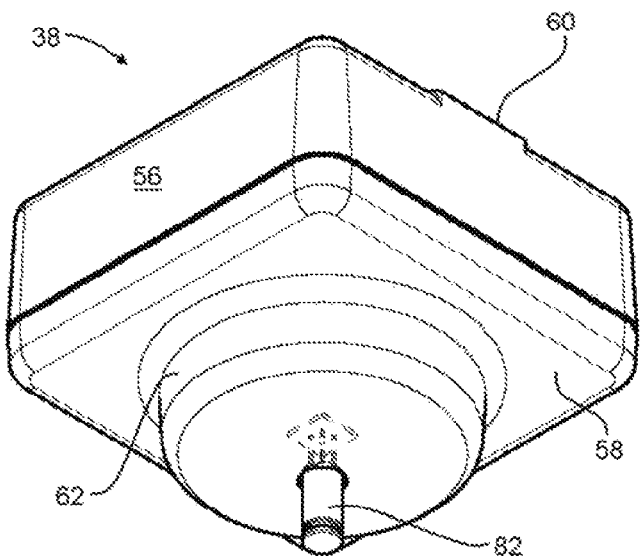
FIG. 13 illustrates a perspective view of a thermometer module.
Figure 14:
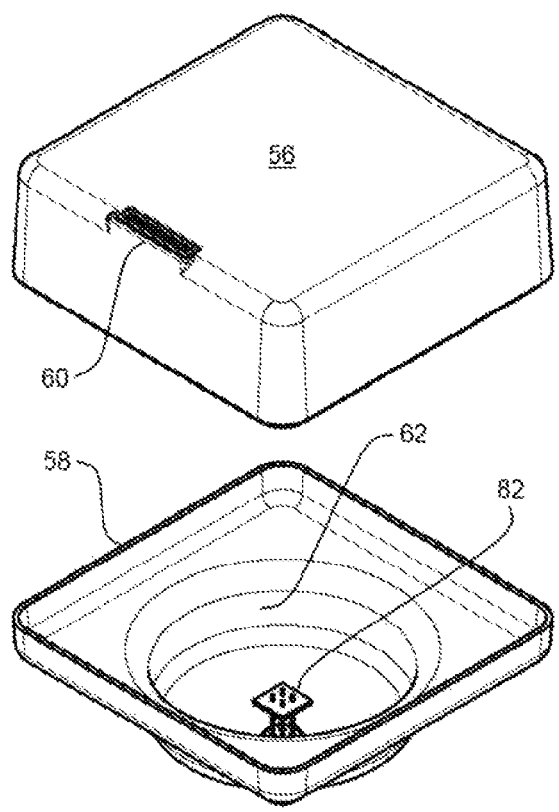
FIG. 14 illustrates an exploded view of the thermometer module.

Referring to FIGS. 13 and 14, the thermometer module 38 is shown. The thermometer module 38 includes a thermometer 82 for sensing the ambient temperature. Preferably the thermometer 38 is an electronic, lead free, RoHS compliant thermometer, which is sensitive to wind chill and other environmental factors.

Figure 15:
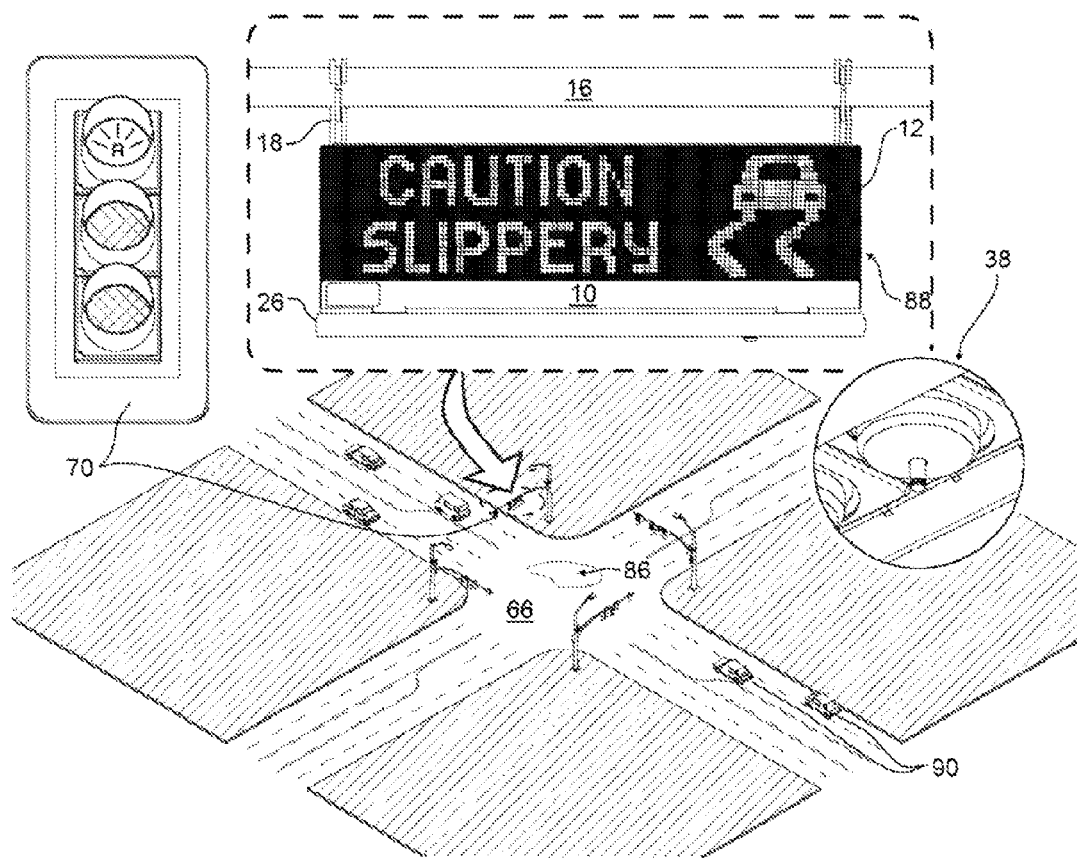
FIG. 15 illustrates an intersection with the thermometer module in operation and the screen displaying an iced road warning.

Referring to FIG. 15, the thermometer module 34 is shown in operation installed at an intersection 66. In the exemplary installation, an iced road hazard 86, such as ice formed in the intersection 66 occurs from freezing temperatures, and the traffic display 10 receiving temperature information from the thermometer 82 causes the screen 12 to display an iced road hazard warning 88. Since roads function as a heat sink and do not immediately ice over in freezing weather, the central processor 48 may be programmed such that the screen 12 displays the iced road hazard warning 88 after a predetermined time. Additionally, the central processor 48 may be coordinated with the traffic light 70, causing the traffic light 70 to flash red to cause vehicles 90 to stop before reaching the iced road hazard 86 in the intersection 66.

Figure 16:
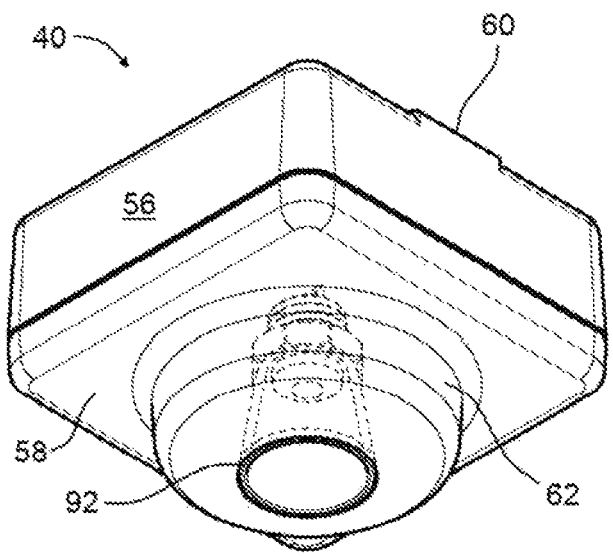
FIG. 16 illustrates a perspective view of a range sensor module.
Figure 17:
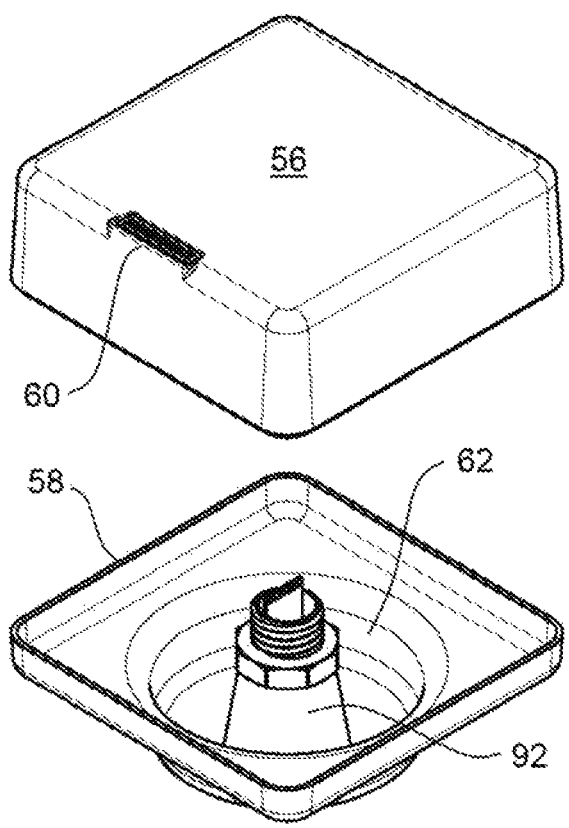
FIG. 17 illustrates an exploded view of the range sensor module.

Referring to FIGS. 16 and 17, the range sensor module 40 is shown. The range sensor module 40 includes a range sensor 92 that detects the distance between the range sensor 92 and an object. The range sensor 92 is mounted to point downward from the range sensor module 40, and is preferably a weather resistant ultrasonic sensor, which may be in a PVC housing and with water intrusion resistance common to electrical fittings. The range sensor preferably includes automatic calibration, waveform signature analysis and noise rejection algorithms, to isolate its readings from electrical and acoustic interference. In one embodiment, the sensor is ultrasonic using pulsed signals to detect when a car is present (and detects the corresponding changes in the pulsed signals). Additionally, the system may use an image recognition camera to look at the cars below to detect when cars are in the intersection.

Figure 18:
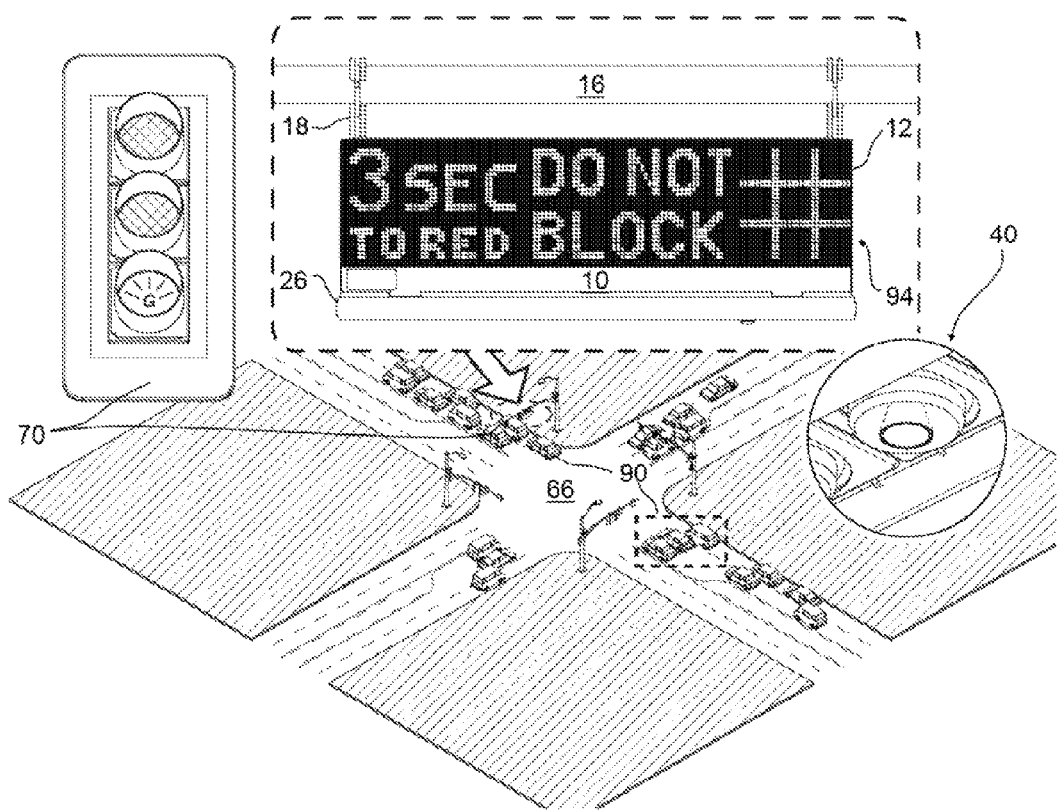
FIG. 18 illustrates an intersection with the range sensor module in operation and the screen displaying a 'do not enter' signal.

Referring to FIG. 18, the range sensor module 40 is shown in operation installed at an intersection 66. In the exemplary installation, a vehicle 90 is caught in traffic, and cannot proceed out of the intersection 66. The vehicle is thus under the traffic display 10 (and range sensor module 40). The range sensor 92 is calibrated for the distance between it and the ground under the traffic display 10. As vehicles pass under the traffic display 10 the range sensor 92 detects changes in distance (from the distance between the range sensor 92 to the ground, to the shorter distance between the range sensor 92 and an upper surface of a vehicle 90).

Normally, the change in distance occurs quickly as vehicles pass under the traffic display 10. When traffic backs up, a vehicle 90 may remain under the range sensor 92 for a longer period of time. Preferably, the central processor 48 is programmed such that when the range sensor 92 detects a shorter distance that doesn't alter for a predetermined time, it causes the screen to display a 'do not enter' signal 94 cautioning drivers not to enter the intersection. Optionally, the 'do not enter' signal 94 may also provide a countdown alerting other vehicles of the number of seconds until the traffic light 70 will turn red. Providing the countdown feature allows vehicles seeing traffic moving on in the distance to ignore the 'do not enter' signal since they will be able to cross through the intersection before the traffic light 70 turns red.

Figure 19:
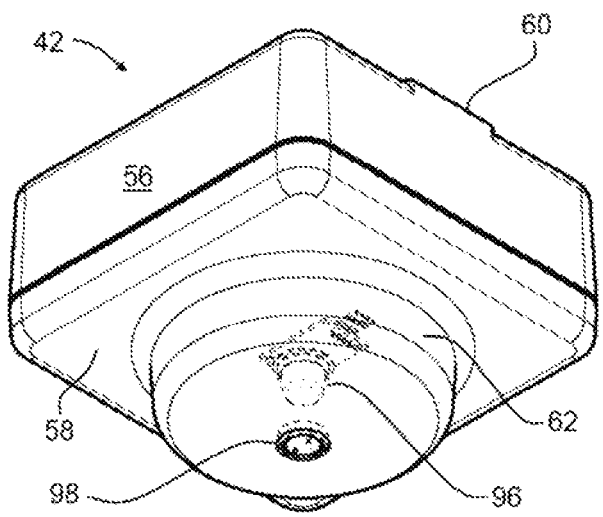
FIG. 19 illustrates a perspective view of an air quality sensor module.
Figure 20:
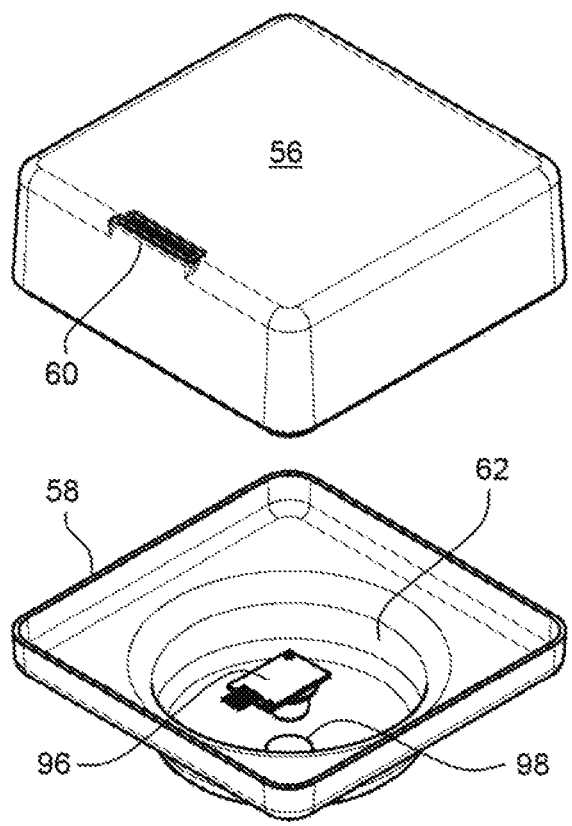
FIG. 20 illustrates an exploded view of the air quality sensor module.

Referring to FIGS. 19 and 20, the air quality sensor module 42 is shown. The air quality sensor module 42 includes an air quality sensor 96 that preferably includes an electro-chemical sensor and heater useful for detecting a variety of harmful chemicals, including the aforementioned ozone (O3) and carbon monoxide (CO), which are typical components of 'smog' or similar vehicle-caused air pollution. In order to provide gradual gas analysis, the air quality sensor 96 may be recessed in the protruding portion 62, with a gas port 98 installed thereon.

Figure 21:
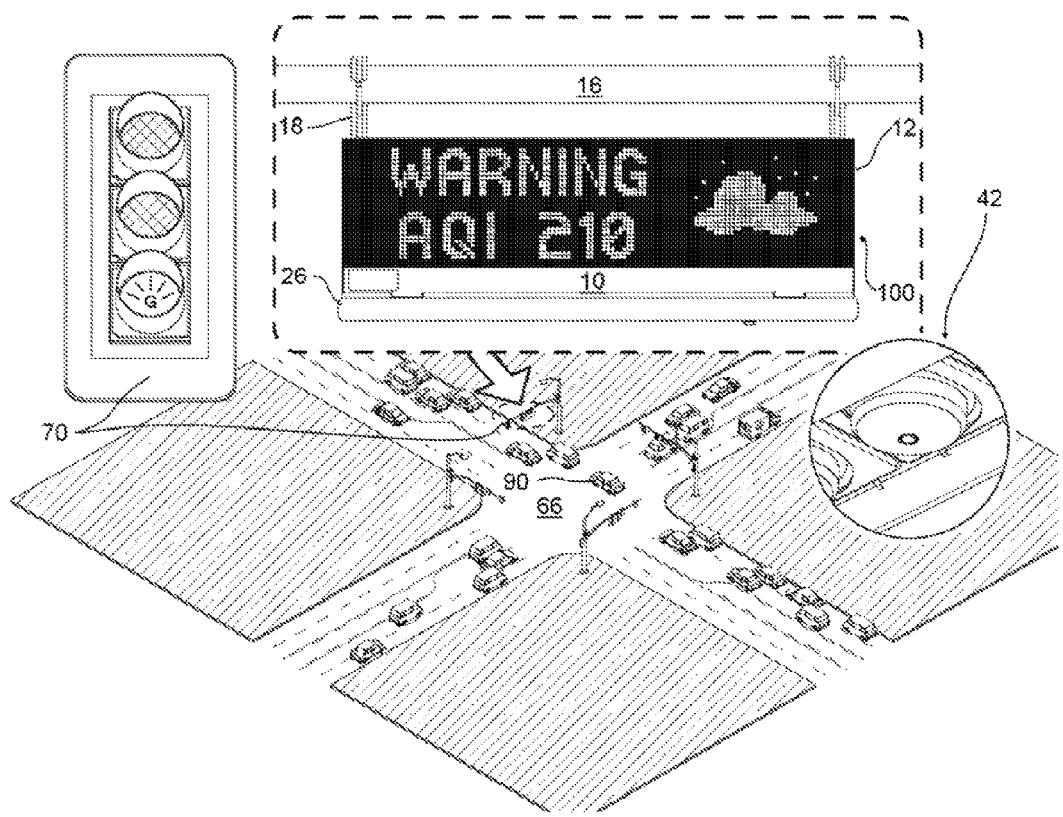
FIG. 21 illustrates an intersection with the air quality sensor module in operation and the screen displaying an air quality warning message.

Referring to FIG. 21, the air quality sensor module 42 is shown in operation installed at an intersection 66. In the exemplary installation, the air quality sensor 42 continuously monitors the air passing by the traffic signal 10. If a predetermined chemical is detected above a predetermine threshold amount, the central processor 48 causes the screen to display an air quality warning message 100, such as an air quality index (AQI) number. Occupants of a vehicle 90 encountering the air quality warning message 100 can take precautions before engaging in strenuous outdoor activities.

Figure 22:
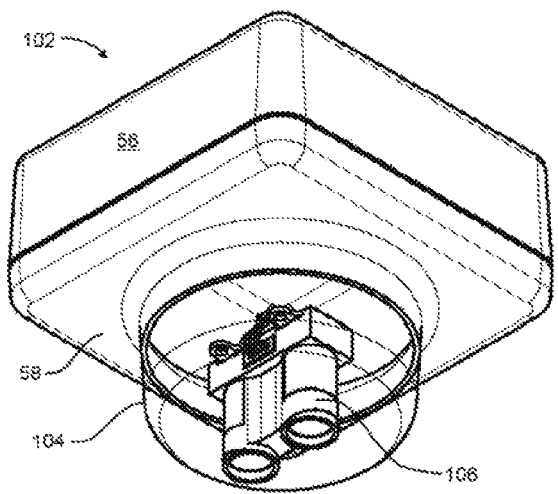
FIG. 22 illustrates a perspective view of a lidar sensor module.
Figure 23:
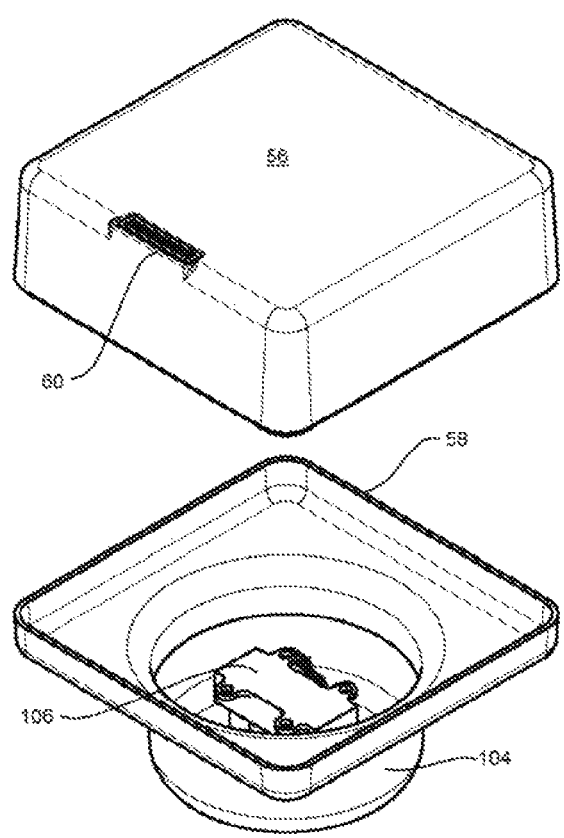
FIG. 23 illustrates an exploded view of the lidar sensor module.

Referring to FIGS. 22 and 23, a LIDAR sensor module 102 is shown. The LIDAR sensor module 102 functions similar to the range sensor 92 (FIG. 16) and is an alternative technology for identifying the presence of vehicles 90 (FIG. 24) blocking lanes of traffic on the far side of an intersection 66, thus disposed under the traffic display 10. The LIDAR sensor module 102 has the same top shell 56 and bottom shell 58 as the other modules, thus maintaining the interchangeable nature of the modules, and includes a preferably clear LIDAR sensor housing 104 and a LIDAR sensor 106, which uses laser light to measure distance, and communicates distance changes to the central processor 48.

Figure 24:
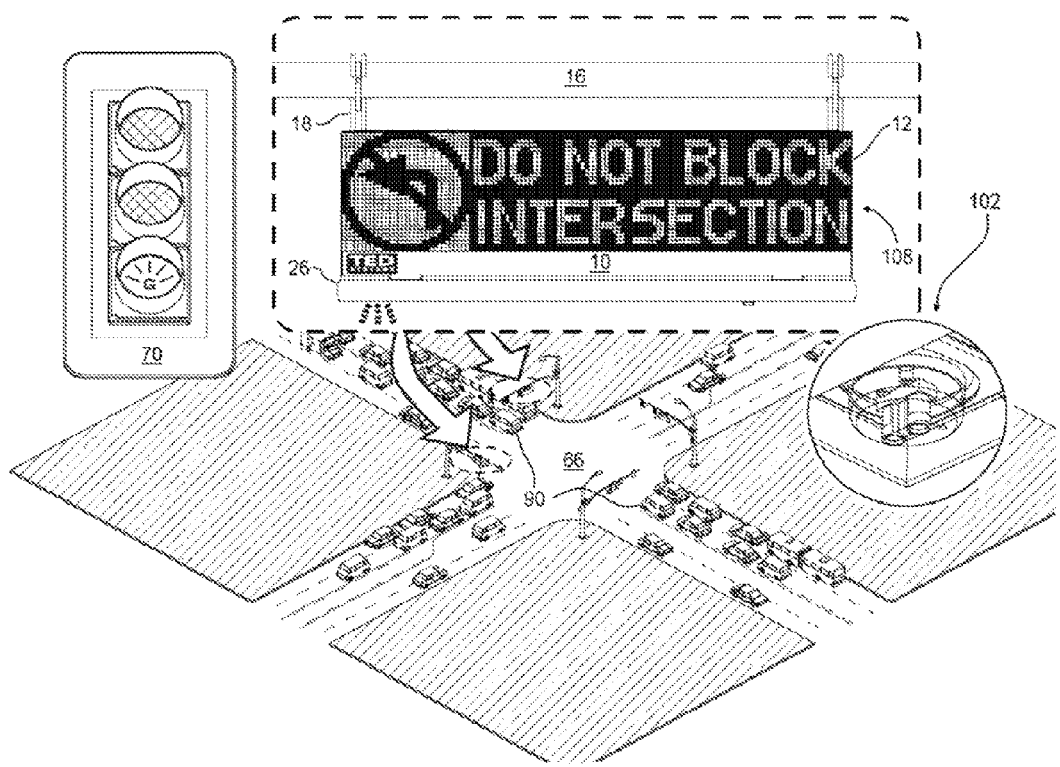
FIG. 24 illustrates an intersection with the lidar sensor module in operation and the screen displaying a 'Do Not Block' warning message.

FIG. 24 illustrates an intersection with the LIDAR sensor module 102 in operation and the screen 12 displaying a 'Do Not Block Intersection' warning 108 on the traffic display 10. When a vehicle 90 comes to rest under the LIDAR sensor module 102, the central processor 48 detects the reduced distance between the traffic display 10 and the vehicle 90, and causes the 'Do Not Block Intersection' warning 108 to appear on its traffic display 10. Preferably, a corresponding 'no left turn' icon 110 appears alongside the 'Do Not Block Intersection' message 108, and both appear on a traffic display 10 corresponding to vehicles 90 that would otherwise block the intersection 66 by making a left turn from a perpendicular direction. Once a vehicle 90 triggering the 'Do Not Block Intersection' message 108 and no left turn icon 110 moves out from under the traffic display 10, the central processor 48 detects the change and stops displaying those warnings.

Preferably, the central processor 48 is programmed to detect LIDAR changes of a particular distance range to avoid triggering warnings when non-vehicular objects pass under the traffic display 10. Also, the central processor 48 is preferably programmed to detect LIDAR changes of a particular time interval. In this manner, false alarm warnings when debris (not shown) comes to rest under the LIDAR sensor module 102, and during the normal passage of vehicles 90 under the LIDAR sensor module 102 are avoided.

Figure 25:
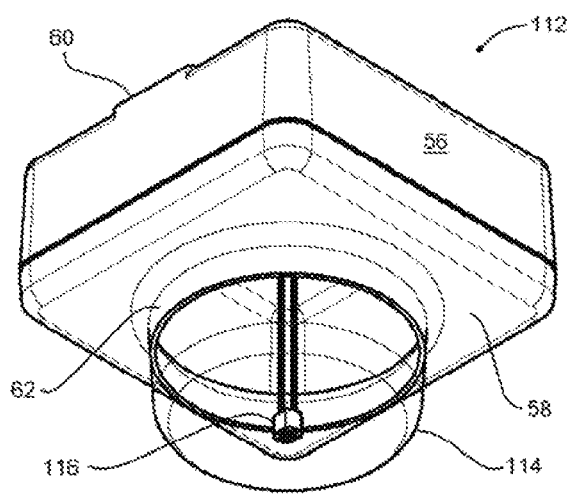
FIG. 25 illustrates a perspective view of a light sensor module.
Figure 26:
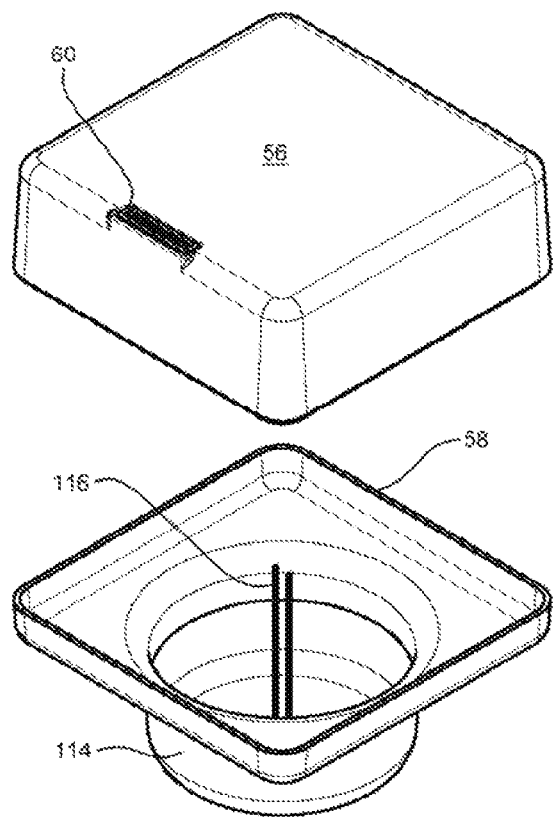
FIG. 26 illustrates an exploded view of the light sensor module.
Figure 27:
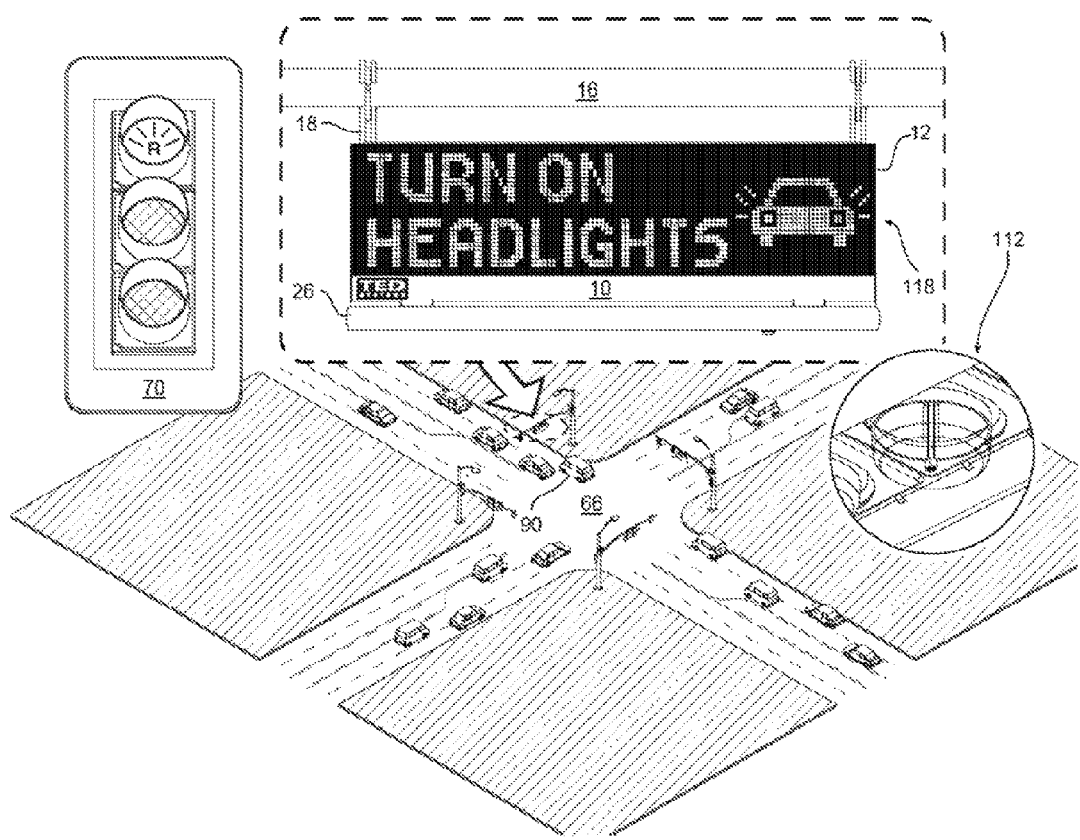
FIG. 27 illustrates an intersection with the light sensor module in operation and the screen displaying a 'Turn on Headlights' warning message.

Referring to FIGS. 25 and 26, a light sensor module 112 is shown. The light sensor module 112 is used to detect ambient light (i.e., sunlight) in the environment of the traffic display 10, and prompt the central processor 48 to display a 'Turn on Headlights' warning 118. The light sensor module 112 has the same top shell 56 and bottom shell 58 as the other modules, thus maintaining the interchangeable nature of the modules, and includes a preferably clear light sensor housing 114 and a light sensor 116, which detects ambient light to measure distance, and communicate changes in distance to the central processor 48. When the central processor 48 detects a change in FIG. 27 illustrates an intersection with the light sensor module 112 in operation and the screen 12 displaying a 'Turn on Headlights' warning 118 on the traffic display 10. When the ambient light (e.g., sunlight or other environmental illumination) falls below a predetermined level, the central processor 48 detects the low light level from the light sensor 116 and causes the traffic display the 'Turn on Headlights' warning 118. Preferably central processor 48 is programmed to detect the speed of light level changes, so that a low light level for a prolonged period of time is required, thus avoiding the 'Turn on Headlights' warning 118 being improperly activated from darkness caused by a passing object, or deactivated by a passing light source. Additionally the central processor 48 is preferably programmed such that after a predetermined period of time in darkness the 'Turn on Headlights' warning 118 is deactivated when not needed in late hours due to low visibility.

In some embodiments, the 'Turn on Headlights' warning 118 may be hierarchically integrated with other warnings, such that it can be interrupted if needed, such as by the 'Do Not Block Intersection' warning 108 when traffic backs up to an intersection. Additionally, the 'Turn on Headlights' warning 118 may be integrated with information from the camera module 34 to detect when vehicles 90 are passing the traffic display 10 in near darkness without lights, thus enabling a specific 'Turn on Headlights' warning 118 to be directed at a specific vehicle.

Figure 28:
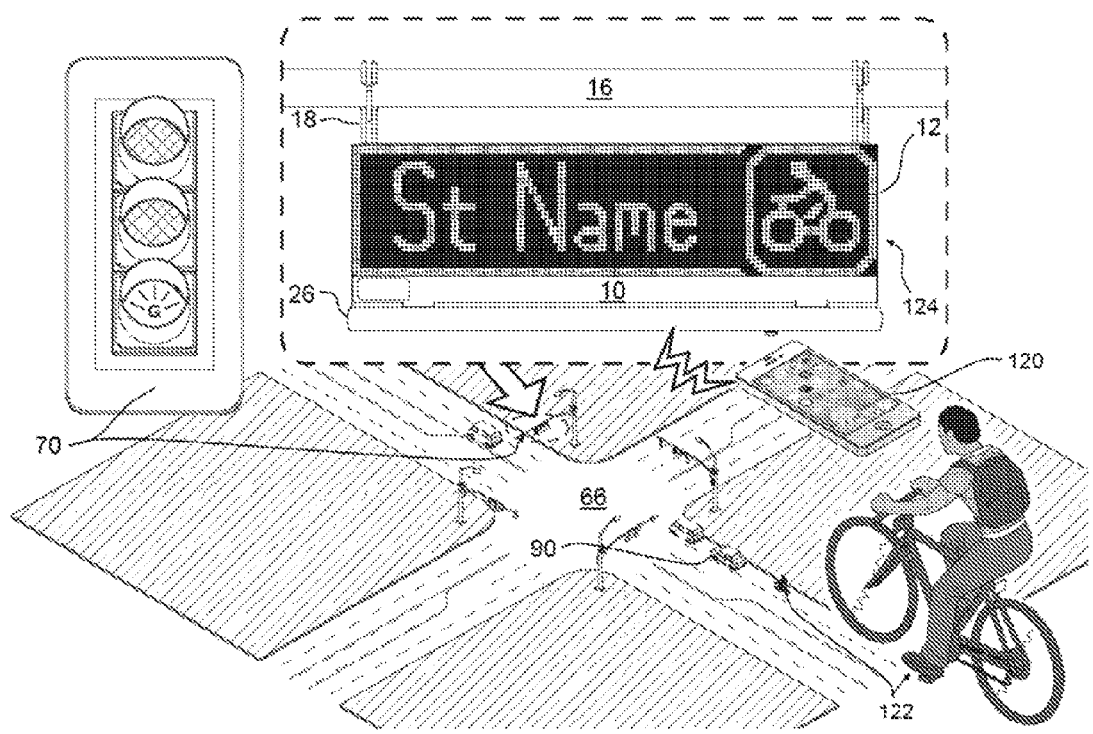
FIG. 28 illustrates an intersection with a bicyclist's cell phone triggering the traffic display to show a 'bicyclist' warning message to nearby vehicles.

Referring to FIG. 28, the central processor 48 of the traffic display 10 may include programming allowing it to interface with a cell phone 120 and generate an alert based on the proximity of the cell phone 120 to an intersection. One exemplary embodiment is illustrated wherein a bicyclist 122 is approaching the traffic display 10 with a cell phone 120 on which a dedicated traffic display 10 interface application running. Using cell signal or other wireless communication, the cell phone 120 communicates the bicyclist's 122 location (directly or indirectly) to the central processor 48, which then causes the screen 12 to display a 'Bicyclist' warning message 124. Although the traffic light 70 is green, giving the bicyclist 122 the right of way, by providing the 'Bicyclist' warning message 124, many collisions between the bicyclist 122 and vehicles 90 can be avoided as the bicyclist 122 enters the intersection 66.

Figure 29:
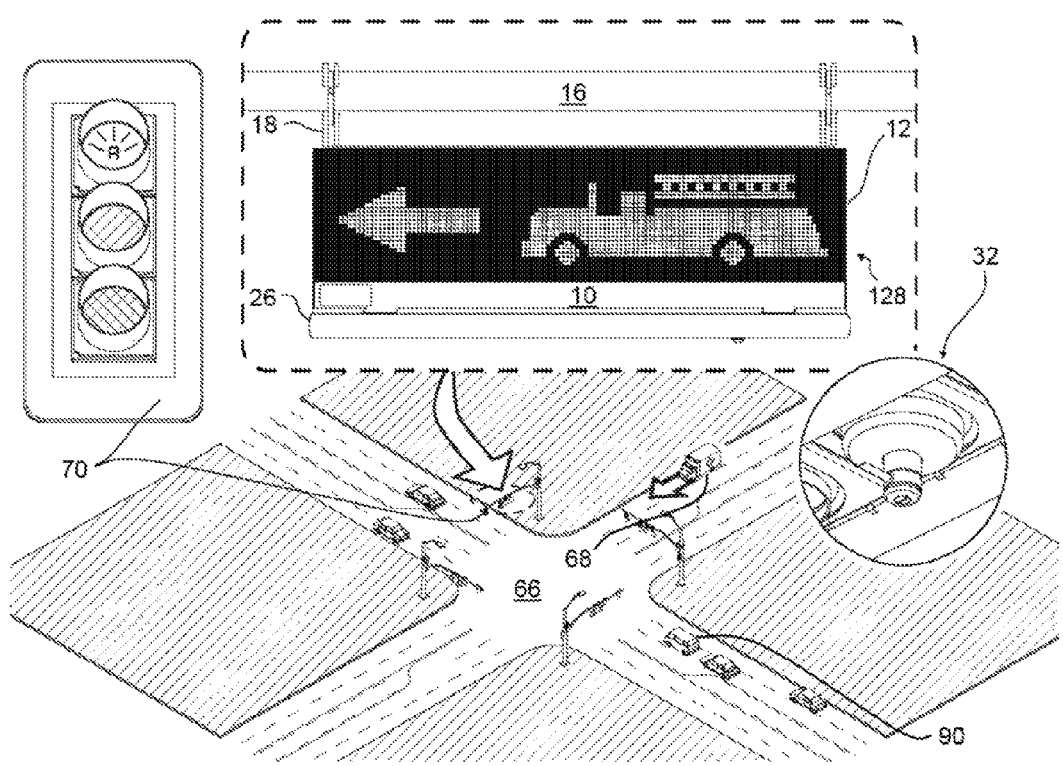
FIG. 29 illustrates an intersection with the traffic display showing an emergency vehicle's direction of travel perpendicular to oncoming traffic.
Figure 30:
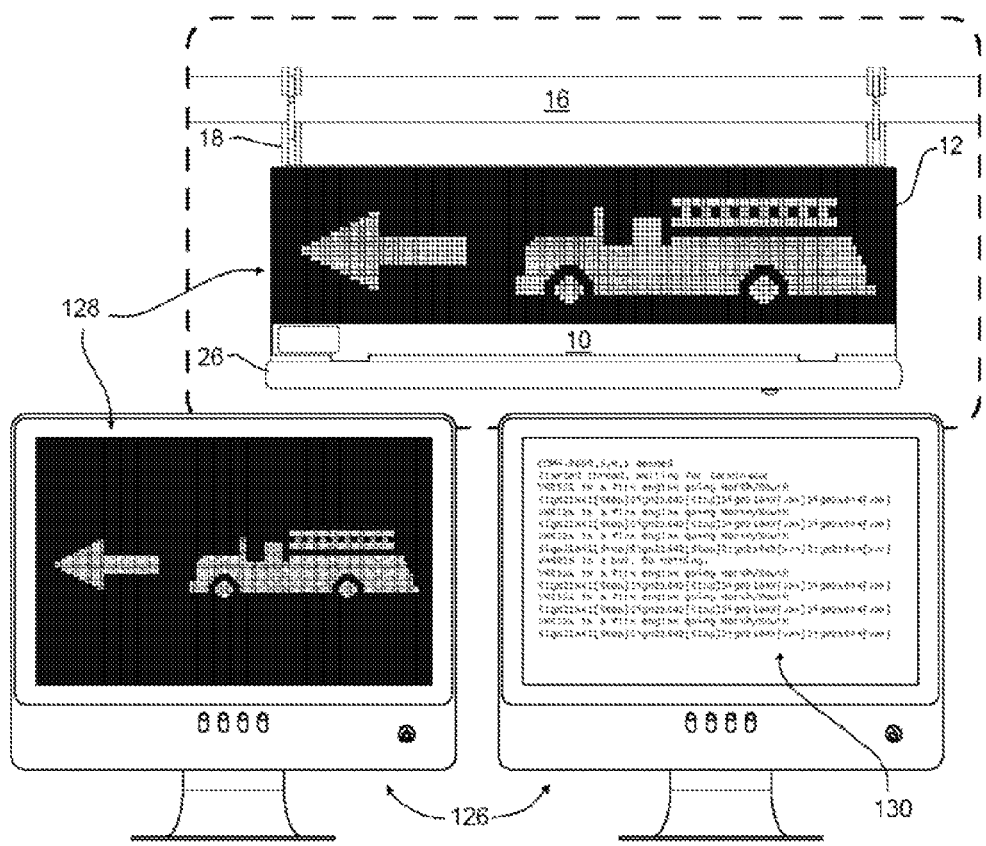
FIG. 30 illustrates the interface between the traffic display and a central traffic processing computer, identifying the route of an emergency vehicle.

FIGS. 29-30 illustrate the ability of the traffic display 10 to triangulate the position of emergency vehicles 68 and alert vehicles 90 in cross traffic of an approaching emergency vehicle 68. As discussed, the infrared sensor module 32 operates similar to existing infrared sensors that engage a traffic light 70, turning it green or lengthening an already green traffic light 70. In the embodiments disclosed in FIGS. 7-9, the central processor 48 receives infrared signal from the infrared module, and communicates information regarding the signal to one or more central traffic control computers 126.

The central traffic control computers 126 record the location of each intersection 66 approached by the emergency vehicle 68, including the direction from which the emergency vehicle 68 is travelling. By establishing the position and direction of travel of the emergency vehicle 68, the central traffic control computers 126 can then engage central processors 48 on other traffic displays 10 in the intersection 66 to provide an 'emergency vehicle crossing' warning 128. By providing such a warning, vehicles 90 traveling perpendicular to the emergency vehicle's 68 line of travel will be advised of its approach.

Such a warning is important particularly when the infrared sensor module 32 picks up infrared signal from an approaching emergency vehicle 68 and causes a traffic light 70 to turn red prematurely. Without such a warning, vehicles 90 may be encouraged to speed up to try and make it through the intersection before the light turns red. Preferably, the traffic control computers 126 create a travel record the entire route of an emergency vehicle 68, and have the ability to select among a variety of appropriate 'emergency vehicle crossing' warnings 128. In addition to the 'emergency vehicle crossing' warning 128 appearing on the central traffic control computers 126, a travel record 130 is also displayed, reflecting the extended route of an emergency vehicle 68.

Figure 31:
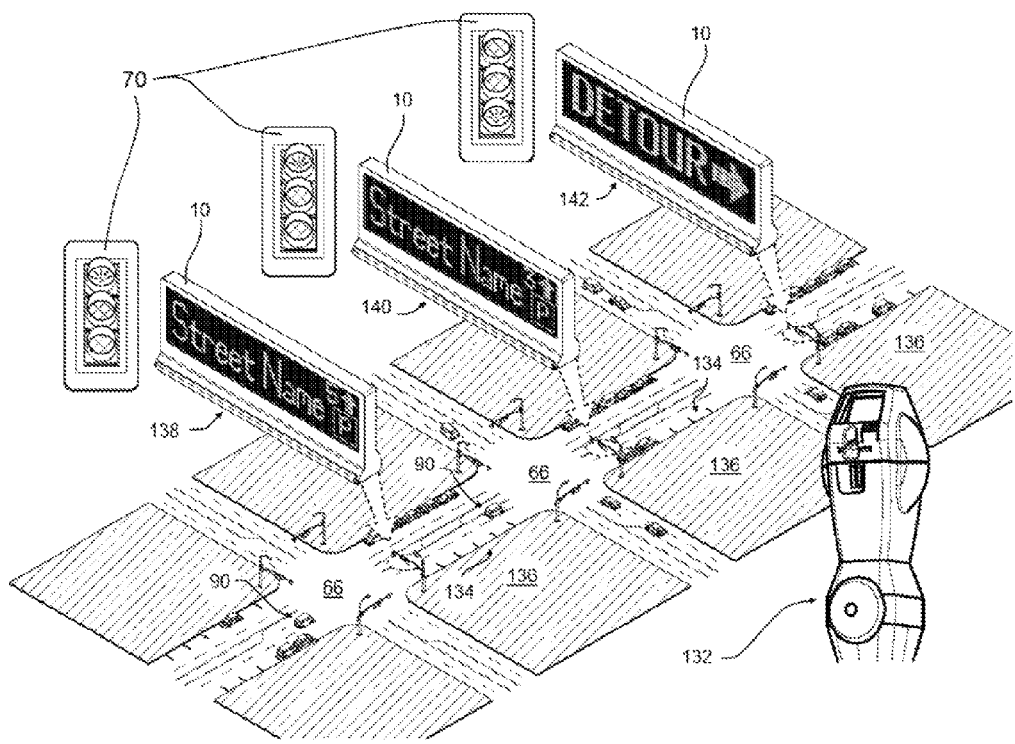
FIG. 31 illustrates a series of intersections with traffic displays showing available parking spaces between each intersection.

Referring to FIG. 31 by interfacing with a series of smart parking meters 132, several traffic displays 10 can be used in high-commerce areas to coordinate the parking of vehicles 90. When performing this function, the central processor 48 of a traffic display 10 collects data from all parking spaces 134 along a city block 136; preferably each block 136 is behind the traffic display 10 when viewed from an oncoming vehicle 90. The central processor 48 of the traffic display 10 receives information from each smart parking meter 132, and indicates the number of parking spaces 134 along each city block 136. Examples include a '5 parking spaces' message 138 or a '3 parking spaces' message 140. In areas where there are no parking spaces, particularly at times when most drivers are looking for parking, such as during a sporting or holiday even, the screen may display a detour message 142. Optionally, for safety, identifying free parking spaces 134 only occurs when the traffic light 70 is red.

Figure 32:
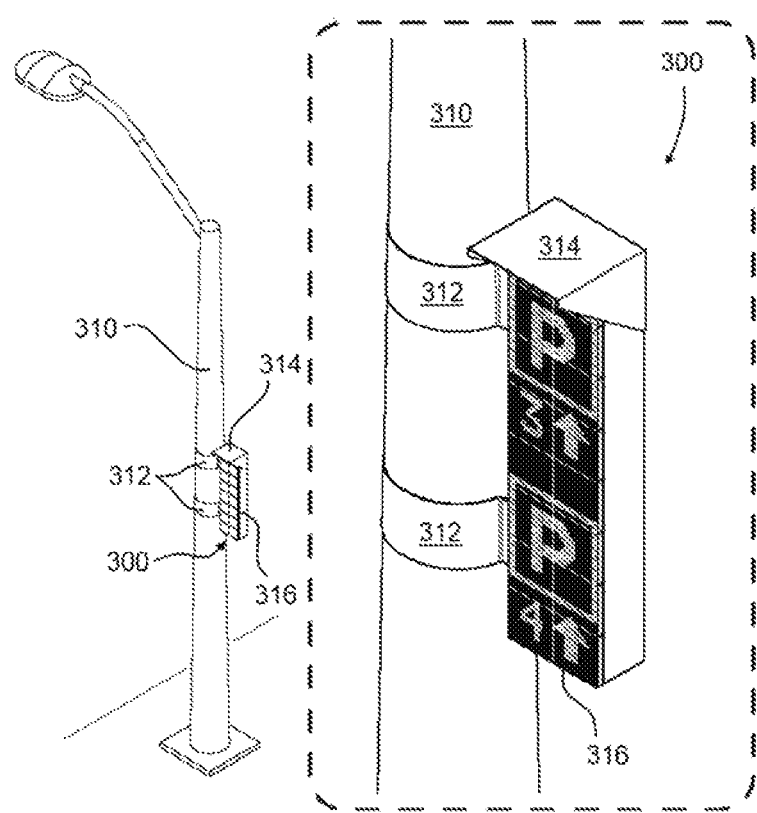
FIG. 32 illustrates a third embodiment traffic display arranged vertically for attachment to a street light and displaying parking space availability.

Referring to FIG. 32, a third alternative embodiment display 300 is shown. The traffic display 300 is oriented for installation on a municipal pole 310 with or without a traffic light (not shown), using mounting bands 312 which are preferably steel or a similar resilient material. The traffic display 300 includes a specially designed hood 314 for vertical orientation and shading the screen 316 from sunlight. The traffic display is preferably installed on a corner (not shown), such that it can indicate available parking spaces along two perpendicular streets converging on the corner.

Figure 33:
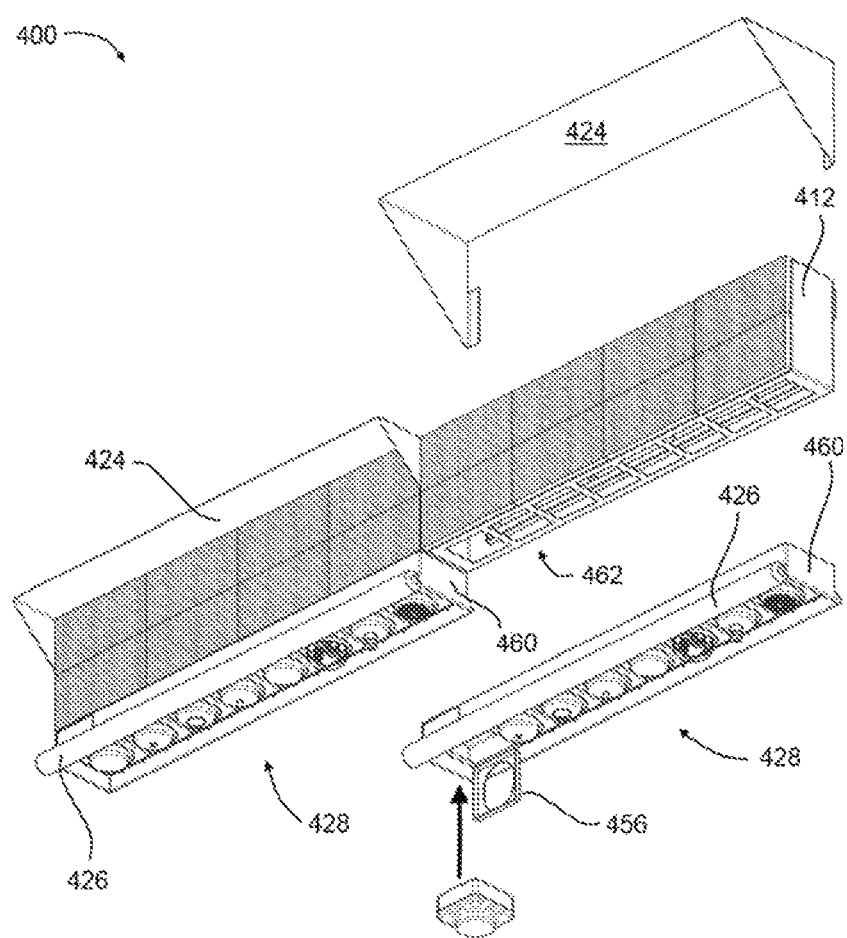
FIG. 33 illustrates a fourth embodiment traffic display based on the second embodiment, wherein a second preexisting display screen is installed alongside the first.

Referring to FIG. 33 a fourth alternative embodiment display 400 is shown in a partially exploded view. This embodiment takes advantage of the modularity of pre-existing screens 412 allowing multiple pre-existing screens 412 to be individually fitted with cowls 424 and bumpers 426 to create an elongated traffic display 400. This view also shows the modules 428 which are inserted into the hinged panels 456 of a module dock 460. Module ports 462 on the pre-existing screen 412 allow access to the modules 428 from within the pre-existing screen 412.

Figure 34:
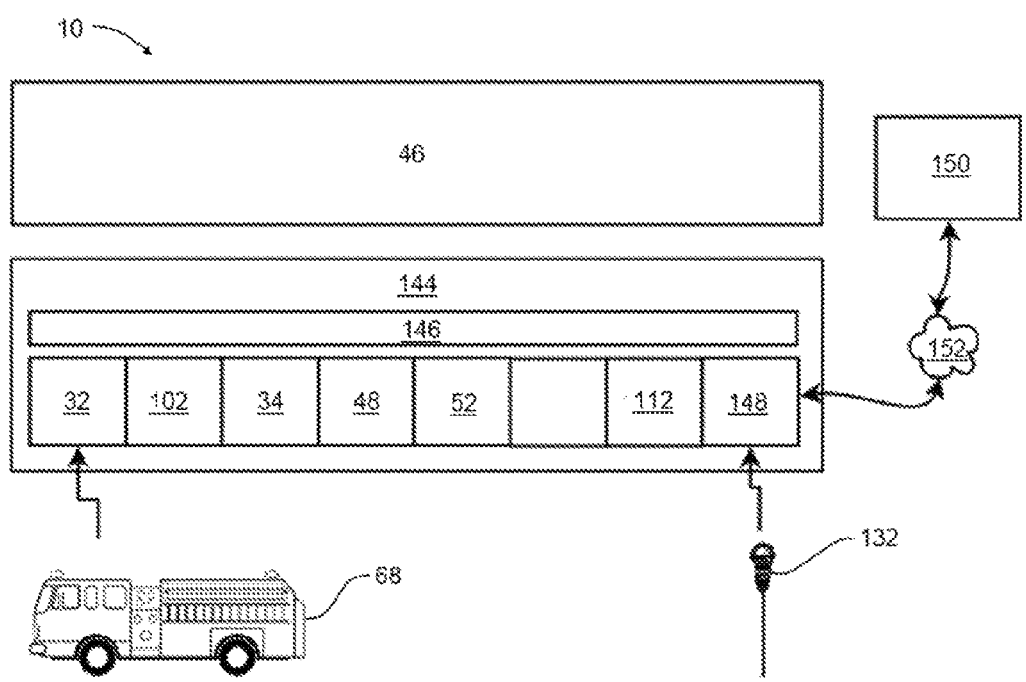
FIG. 34 illustrates a block diagram of an exemplary traffic alert sign installation.

Referring to FIG. 34, a block diagram of the traffic alert sign 10 is shown, comprising an off-the-shelf LED panel 46 and a hub 144 which supports many different optional modules 28 to improve traffic flow and public safety. A connector strip 146 may be provided for providing power and information transmission from the modules 28 to the central processor 48 and power supply 52. Although the hub 144 accepts any of the modules 28, the modules 28 of the illustrated embodiment include an infrared module 32 for detecting oncoming emergency vehicles, such as fire trucks and ambulances and warns other vehicles to move to the right and stop. Preferably the infrared module 32 supports supports the GTT® OPTICOM® infrared sensor (not shown).

Other modules include the lidar sensor module 102 for sensing gridlock and displaying a "Do Not Block Intersection" message 108, the camera module 34 that transmits real-time video back to a central traffic control computer 126, the light sensor module 112 that senses street brightness and issues a "Turn On Headlights" message reminding drivers to turn on their headlights at dusk and also adjusts the LED panel 46 brightness, the parking, a parking module 148 that receives parking information and informs drivers of available parking spaces in the vicinity. This module can be made to support the IPS GROUP® API (application programming interface). The parking module 146 may be in contact with a parking management server 150 which coordinates parking information for a predetermined area such as a neighborhood or municipality. Additionally, the parking module 146 and parking management server 150 may be connected using a network connection 152, including the Internet. Other modules 28 maybe included according to desired functionality, making the traffic alert sign 10 fully customizable.

Figure 35:
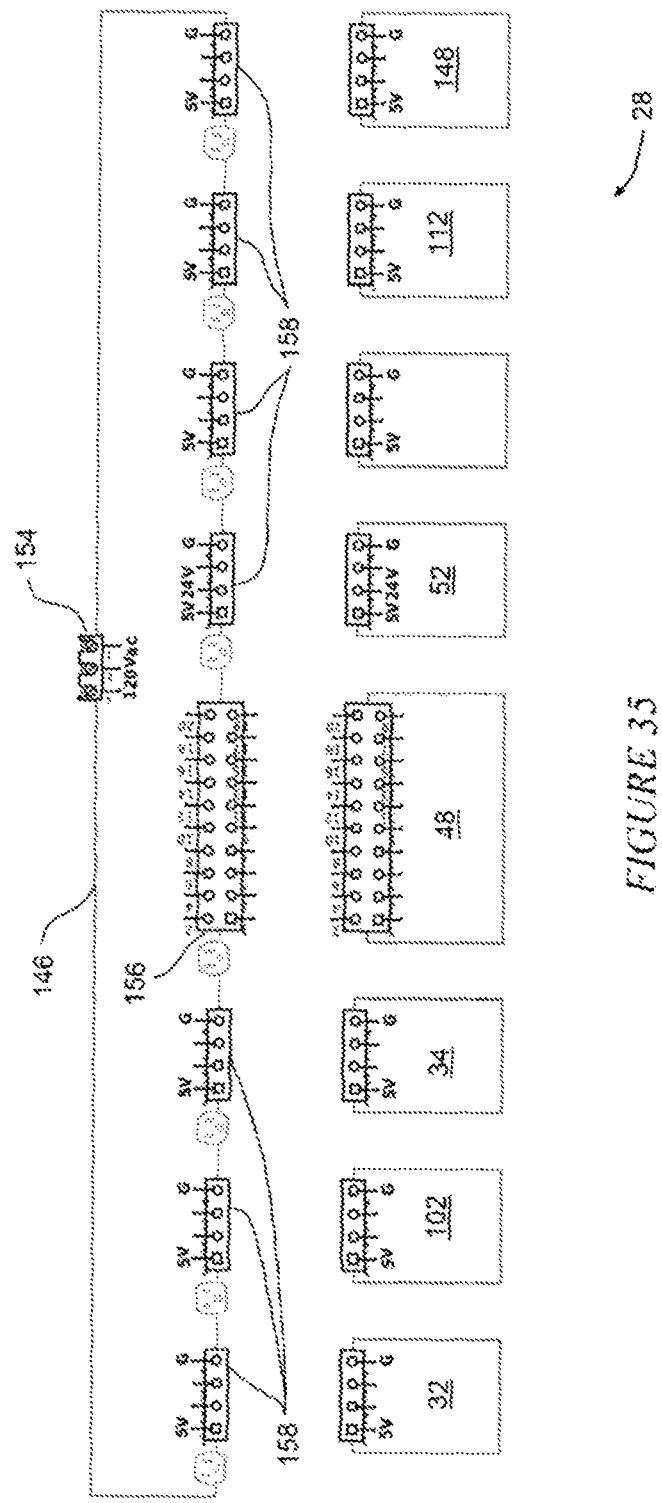
FIG. 35 illustrates an electrical diagram of the modules and a connector strip.

Referring to FIG. 35, an electrical diagram of the embodiment shown in FIG. 34 is shown, with the connector strip 146 connected to the infrared module 32, lidar sensor module 102, camera module 34, central processor 48, power supply 52, light sensor module 112 and parking module 148. Preferably the connector strip 145 includes magnetic connections for ease of replacement, particularly when performed in the field, and all sensor modules 28, including those illustrated, preferably connect to the connector strip 146 electrically via cables. The connector strip includes an AC terminal block 154 and several AC power outlets including a 2×10 IDC connector 156 and several 1×4 connectors 158.

The connector strip 146 handles routing AC power, 5 Vdc power, 24 Vdc power, and I/O pins. It preferably accepts 120/240 Vac as input at terminal block 2, goes through a fuse and MOV surge protector (not shown), and routes it to the 1×4 connectors 158 to provide power to the sensor modules 28 (including those illustrated). All 5V pins of the connector strip 146 are connected together to provide 5V to the central processor 48 and the sensor modules 28. The 5V pin associated with the power supply module 52 receives power from the power supply module 52. Preferably all G pins of the connector strip 146 are connected together to provide a common ground to all modules. Two different I/O pins of the 2×10 IDC connector 156 are routed to the 1×4 IDC connectors, and all the I/O pins of those modules are connected through a cable to the central processor module 48. Firmware in the central processor module 48 keeps track of the pin assignments.

Figure 36:
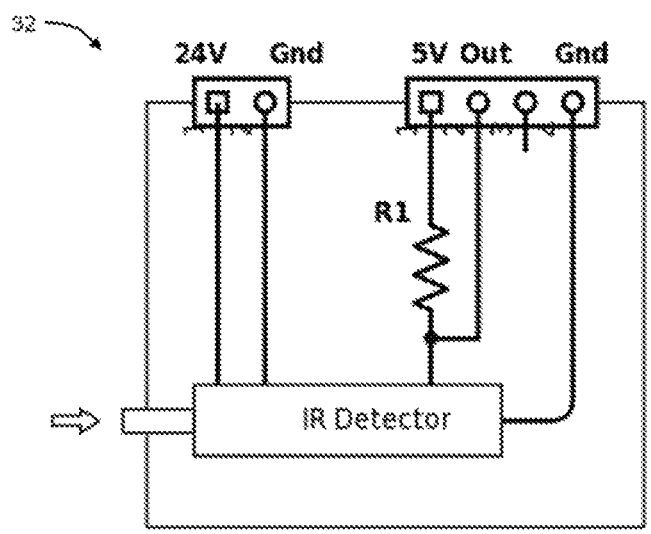
FIG. 36 illustrates an electrical diagram of the infrared sensor module.
Figure 37:
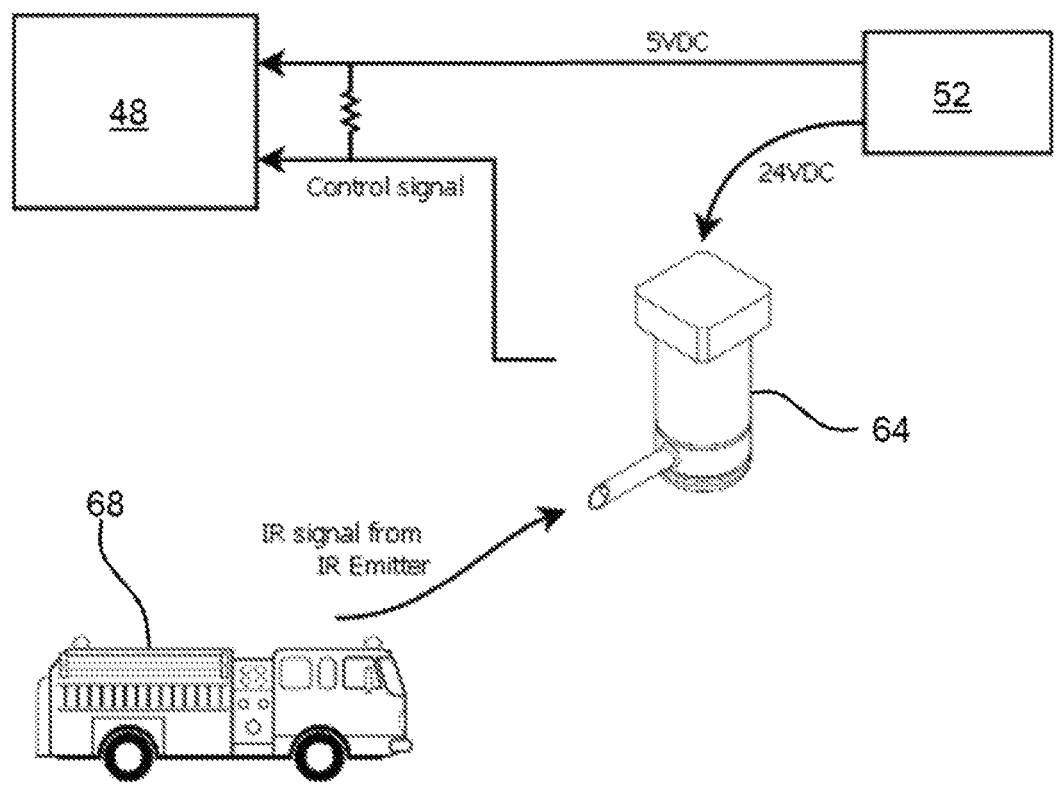
FIG. 37 illustrates the infrared sensor interacting with an emergency vehicle.
Figure 38:
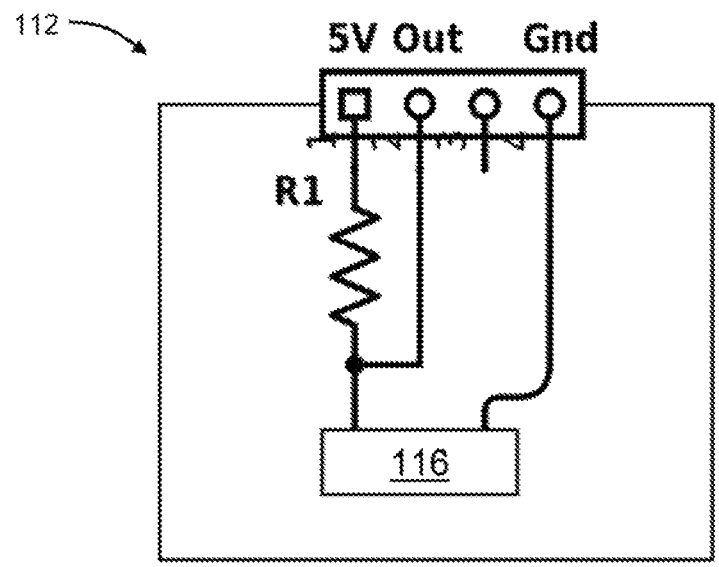
FIG. 38 illustrates an electrical diagram of the light sensor module.

Referring to FIG. 36, an electrical diagram of the infrared module 32 is shown. The infrared module 32 is connected to the connector Strip 146. Through the connector strip 146, it gets 24 Vdc from the power supply 52 and outputs a signal to the central processor 48. It receives IR signal from an IR emitters mounted on an emergency vehicle, such as a fire, ambulance, or police vehicle. Upon activation, it sends a signal to the central processor 48, and with the preconfigured direction in which the infrared sensor 64 is pointed, the central processor 48 sends a message to the traffic display 10 to warn motorists of an approaching emergency vehicle. In one preferred embodiment, the message can be an animated right-moving chevron display, among other displays. Additionally, the infrared central processor 48 relays the message to other traffic displays 10 at an intersection. Referring to FIG. 38, the infrared detector is connected to the central processor 48 and the power supply 52. Since the infrared detector housed in module underneath the traffic sign 10, it is installed upside down.

Referring to FIG. 38, an electrical diagram of the light sensor module 112 is shown, capable of detecting street brightness and warning motorists to turn on their headlights. It is composed of a light sensor 116, a circuit, and a 4-pin connector, and is connected to the connector strip 146. Through the connector strip 146, the light sensor module receives 5 Vdc from the power supply 52 and transmits an analog signal to the central processor 48. It works as follows: At dusk, when the sky darkens, the resistance in the light sensor 116 increases causing the voltage at pin 2 to increase. The central processor 48 reads this higher voltage to determine that it is now at dusk and sends a message to the traffic display 10 to display a "Turn on Headlights" warning.

Figure 39:
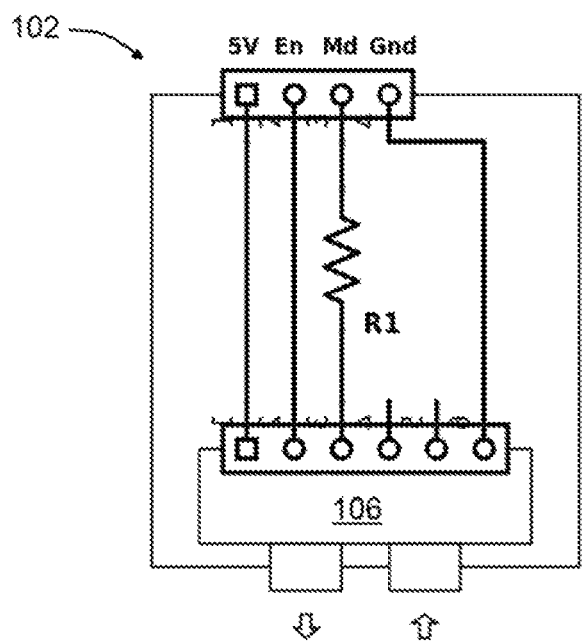
FIG. 39 illustrates an electrical diagram of the lidar sensor module.

Referring to FIG. 39, an electrical diagram of the lidar sensor module 102 is shown capable of detecting traffic gridlock at an intersection. The lidar sensor module is composed of a lidar (light Detection And Ranging) sensor 106, a circuit, and a 4-pin connector connected to the connector strip 146. Through the connector strip 146 the lidar sensor module receives 5 Vdc from the power supply 52 and outputs a signal to the central processor 48. The lidar sensor module 102 is installed with the lidar sensor 102 pointed downward and controlled by the central processor 48 to sense distances below the lidar sensor module 102. When a vehicle 90 is directly underneath it, the distance detected is less than when no vehicle 90 is under it. When a vehicle 90 idles below the lidar sensor module 102 it for more than 5 seconds, or another pre-programmed period of time, it interprets the condition as a traffic backup at the intersection, and the central processor 48 software thus causes a "Do Not Block Intersection" warning to appear on the traffic display 10 to avoid a traffic gridlock condition.

Figure 40:
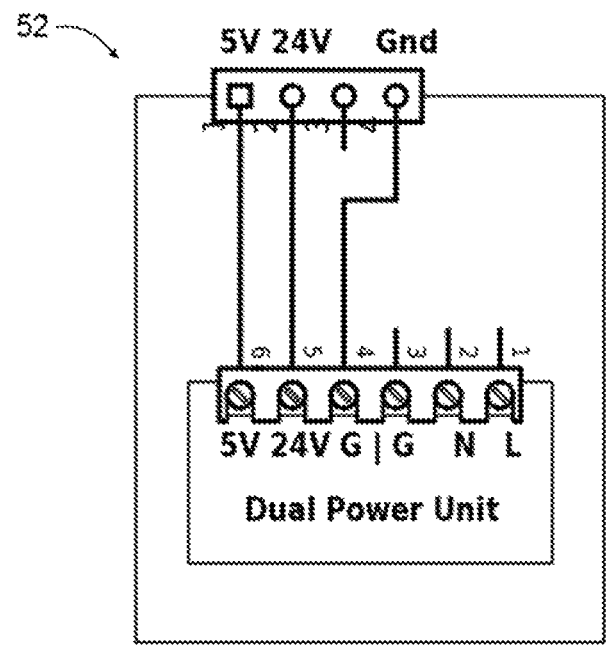
FIG. 40 illustrates an electrical diagram of the power supply.

Referring to FIG. 40, the power supply 52 provides 5 Vdc and 24 Vdc to the connector strip 146, which in turn distributes power to the sensor modules 28 (including the lidar sensor module 102, light sensor module 112, infrared sensor module 32, etc.) The power supply 52 is preferably composed of an off-the-shelf power module to provide 5 Vdc and 24 Vdc wired to the proper pins on the 1×4 IDC connector 158 when connected to the connector strip 146. The traffic display 10 is designed with a connector strip 146 and removable sensor modules 28 such that if a power supply 52 fails, it can be replaced easily in the field.

Figure 41:
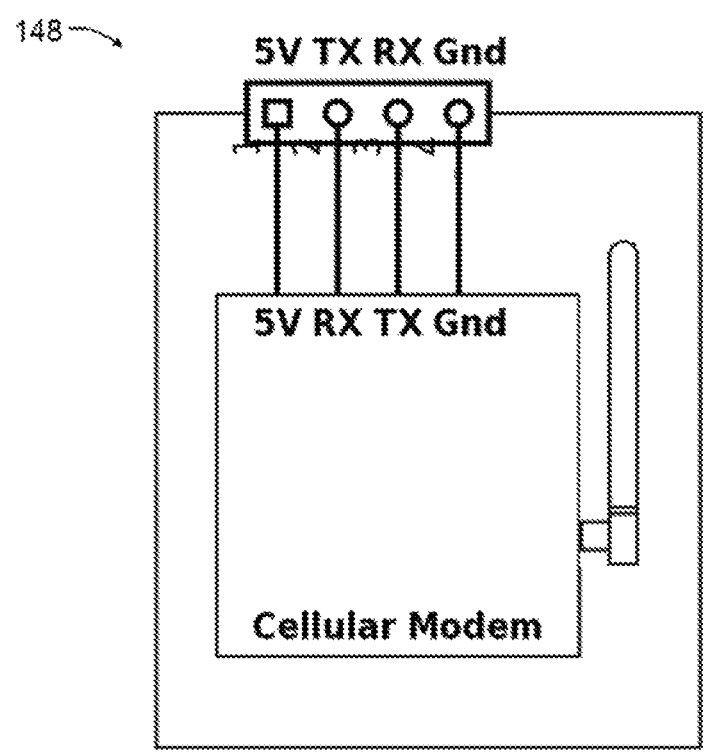
FIG. 41 illustrates an electrical diagram of the parking module

Referring to FIG. 41, the parking module 148 enables the traffic display 10 to connect to a parking management center to obtain parking information to inform motorists of parking availability. The parking module 148 is connected to the central processor 48 through the connector strip 146 on RX and TX lines The central processor 48 preferably uses the parking module 148 to connect through a commercial cellular network to a parking management center or parking meters in order to display available parking spaces in the vicinity of the traffic display 10.

Figure 42:
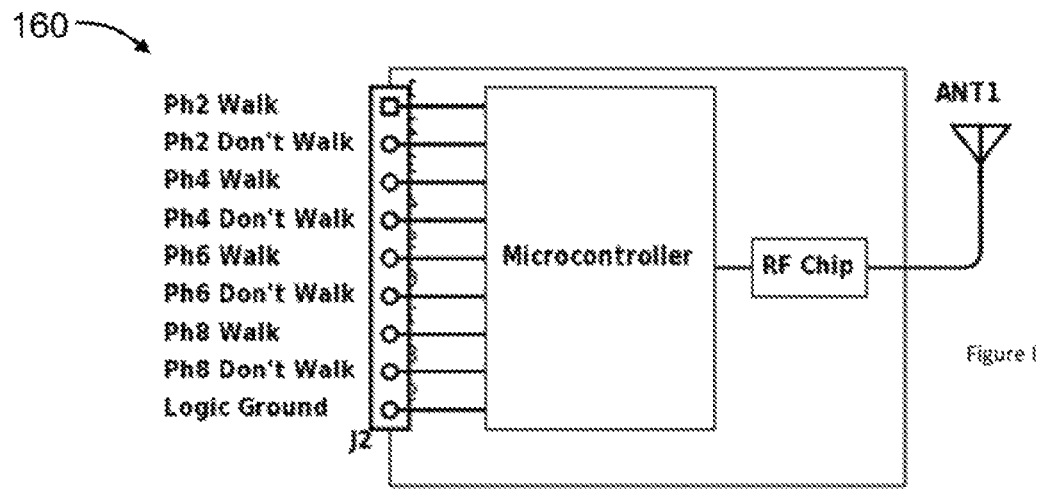
FIG. 42 illustrates an electrical diagram of a pedestrian indicator monitor.
Figure 43:
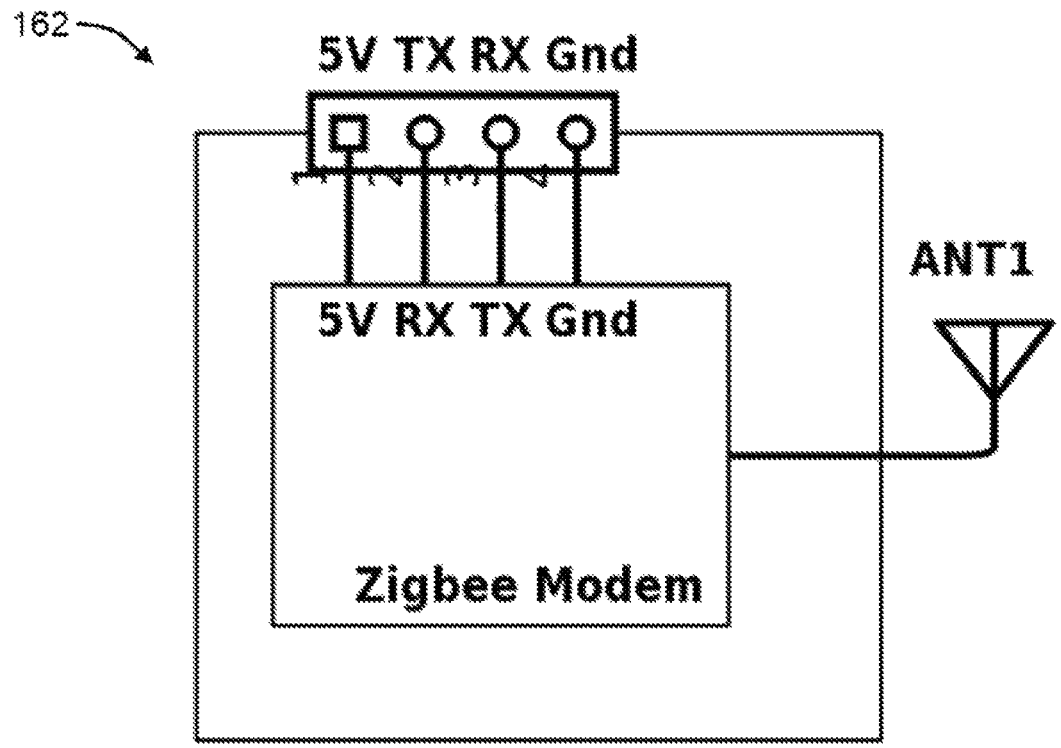
FIG. 43 illustrates an electrical diagram of a pedestrian module.

Referring to FIG. 42, a pedestrian indication monitor 160 monitors the Walk and Don't Walk signals used in a typical four pedestrian phase intersection where four crosswalks are controlled by a central traffic control computer 126. Upon receiving information from the central traffic control computer 126, the pedestrian indication monitor 160 sends the Walk and Don't Walk information wirelessly to individual traffic displays 10 using a pedestrian module 162 (FIG. 43). When the traffic displays 10 receive information from the pedestrian indicator monitor 160, the central processor 48 of each traffic display 10 displays a pedestrian walking image to warn drivers to watch for crossing pedestrians.

Referring to FIG. 43, the pedestrian module enables a traffic display 10 to receive pedestrian indication information wirelessly from the pedestrian indication monitor. This module is connected to the central processor 48 through the connector strip 146 on the RX and TX lines. When the traffic display 10 receives the message programmed for its particular location, it will display the pedestrian walking image to warn motorists of crossing pedestrians.

While the present invention has been described with regards to particular embodiments, it is recognized that additional variations of the present invention may be devised without departing from the inventive concepts.

What is claimed is:

1. An electronic traffic alert system for communicating with an emergency vehicle and a centralized traffic control station comprising:
    a traffic display comprising a screen for displaying graphics, the traffic display configured to hold a plurality of modules;
    the plurality of modules having a substantially uniform shape, such that individual modules are interchangeably connectable to the traffic display;
    the plurality of modules mounted below the screen such that at least one of the plurality of modules extends below the traffic display;
    wherein one of the plurality of modules comprises a distance detector for detecting objects persisting under the traffic display;
    the traffic display further comprising a central processor in communication with the plurality of modules and the screen, the central processor configured to display a predetermined graphic on the screen according to input from at least one of the plurality of modules; and
    an interface to transmit traffic-related information between the traffic display and a centralized traffic control station, thereby allowing control of the traffic display by the centralized traffic control station.

2. The electronic traffic alert system of claim 1 further comprising a connector strip inside the traffic display for removably connecting each of the plurality of modules for ease of service and replacement.

3. The electronic traffic alert system of claim 1 wherein multiple traffic displays are located at a single intersection and are wirelessly connected for coordinating messages displayed on the screen of each of the multiple traffic displays.

4. The electronic traffic alert system of claim 1 wherein one of the plurality of modules comprises an infrared vehicle detector for detecting approaching emergency vehicles.

5. The electronic traffic alert system of claim 1 wherein one of the plurality of modules comprises a light sensor and the central processor is configured to automatically change a brightness level of the screen under changing ambient light conditions.

6. The electronic traffic alert system of claim 1 wherein one of the plurality of modules comprises a parking module in communication with a parking server through a cellular network, the parking module configured to receive available parking space information for display on the screen.

7. The electronic traffic alert system of claim 1 wherein the central processor is in communication with a pedestrian crossing monitor that provides the status of pedestrian crossing signals at an intersection where the traffic display is installed.

8. The electronic traffic alert system of claim 7 wherein one of the plurality of modules comprises a pedestrian module for displaying on the screen pedestrian crossing signal information corresponding to the status.

9. The electronic traffic alert system of claim 1 wherein one of the plurality of modules comprises a feature selected from the group consisting of loudspeaker, camera, thermometer, air quality sensor, and back-up battery pack.

10. The electronic traffic alert system of claim 1 wherein one of the plurality of modules is capable of receiving emergency-related information from a moving vehicle and thereafter causing the traffic display to indicate the direction of the vehicle to drivers travelling in a perpendicular direction.

11. The electronic traffic alert system of claim 1 wherein one of the plurality of modules is configured to receive GPS proximity information from a cell phone, wherein the central processor displays an alert on the screen corresponding to the cell phone.

12. The electronic traffic alert system of claim 1 wherein the traffic display is capable of receiving emergency-related information from the centralized traffic control station and thereafter displaying an alert to drivers regarding lane direction changes.

13. The electronic traffic alert system of claim 1 wherein the traffic display comprises a protective cowl at least partially around the screen.

14. The electronic traffic alert system of claim 1 wherein the traffic display comprises a bumper in front of the screen.

15. The electronic traffic alert system of claim 1 wherein the traffic display is mounted proximal a street sign, the traffic display further comprising a light for illuminating the street sign.

16. The electronic traffic alert system of claim 1 wherein the traffic display is configured for installation adjacent a second traffic display for creating an enlarged screen.

17. An electronic traffic alert system for communicating with an emergency vehicle and a centralized traffic control station comprising:
    a traffic display comprising a screen displaying graphics, the traffic display configured to hold a plurality of modules;
    the plurality of modules having a substantially uniform shape, such that individual modules are interchangeably connectable to the traffic display;
    the plurality of modules mounted below the screen such that at least one of the plurality of modules extends below the traffic display;
    the plurality of modules comprise infrared receiver, distance sensor light sensor, loudspeaker, camera, thermometer, air quality sensor, and back-up battery pack;

the traffic display further comprising a central processor in communication with the plurality of modules and the screen, the central processor configured to display a predetermined graphic on the screen according to input from at least one of the plurality of modules;

an interface to transmit traffic-related information between the traffic display and a centralized traffic control station, thereby allowing control of the traffic display by the centralized traffic control station; and wherein multiple traffic displays are located at a single intersection and are wirelessly connected coordinating messages displayed on the screen of each of the multiple traffic displays.

* * * * *